United States Patent
Lundkvist et al.

(10) Patent No.: US 12,472,447 B2
(45) Date of Patent: Nov. 18, 2025

(54) CHROMATOGRAPHY SYSTEM AND COUPLINGS THEREFOR

(71) Applicant: Cytiva Sweden AB, Uppsala (SE)

(72) Inventors: Mats Lundkvist, Uppsala (SE); Bjorn A. Johansson, Uppsala (SE); Tim Francois, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 19/053,143

(22) Filed: Feb. 13, 2025

(65) Prior Publication Data
US 2025/0177884 A1 Jun. 5, 2025

Related U.S. Application Data

(63) Continuation of application No. 18/047,190, filed on Oct. 17, 2022, which is a continuation of application
(Continued)

(30) Foreign Application Priority Data

Jun. 28, 2017 (GB) .................................... 1710279
Jan. 19, 2018 (GB) .................................... 1800901

(51) Int. Cl.
*B01D 15/22* (2006.01)
*F16L 37/138* (2006.01)
(Continued)

(52) U.S. Cl.
CPC ......... *B01D 15/22* (2013.01); *G01N 30/6026* (2013.01); *F16L 37/138* (2013.01);
(Continued)

(58) Field of Classification Search
CPC .............. B01D 15/22; G01N 30/6026; G01N 30/6052; G01N 2030/027; F16L 37/138; F16L 37/56; F16L 2201/10
See application file for complete search history.

(56) References Cited

U.S. PATENT DOCUMENTS 3,923,925 A 12/1975 Schneider et al.
4,364,263 A 12/1982 Sankoorikal et al.
(Continued)

FOREIGN PATENT DOCUMENTS

CN 102027645 A 4/2011
CN 103124874 A 5/2013
(Continued)

OTHER PUBLICATIONS

PCT International Search Report and Written Opinion for PCT Application No. PCT/EP2018/067498 mailed Nov. 20, 2018 (16 pages).
(Continued)

*Primary Examiner* — Benjamin L Lebron
(74) *Attorney, Agent, or Firm* — Eversheds-Sutherland (US) LLP

(57) ABSTRACT

Disclosed are chromatography systems employing a releasable coupling 100 for holding a fluid tubing to a spigot, the coupling comprising: a cylindrical inner component 110 for accepting a fluid tubing 30, said inner component including a resiliently deflectable portion 118 arranged to urge an outer surface of the tubing toward a spigot; and a cylindrical collar 130 having and internal through-aperture 132 for slideably accepting the inner component, the aperture and resilient portion having complementary surface formations which in a first position of the collar mounted to the inner component provide for said resilient deflection in use, and which in a second different position do not cause said deflection, the coupling being characterized in that the collar comprises a collar flange 134 extending outwardly away from the aperture of a size allowing manual manipulation of the collar between the first and second positions. Chromatography systems employing said couplings is disclosed also.

17 Claims, 25 Drawing Sheets

Related U.S. Application Data

No. 16/622,524, filed as application No. PCT/EP2018/067498 on Jun. 28, 2018, now Pat. No. 11,547,956.

(51) Int. Cl.
- *F16L 37/56* (2006.01)
- *G01N 30/60* (2006.01)
- *G01N 30/02* (2006.01)

(52) U.S. Cl.
CPC .......... *F16L 37/56* (2013.01); *F16L 2201/10* (2013.01); *G01N 2030/027* (2013.01); *G01N 30/6052* (2013.01)

(56) References Cited

U.S. PATENT DOCUMENTS

| | | | |
|---|---|---|---|
| 4,604,198 A | | 8/1986 | Dailey et al. |
| 4,750,764 A | | 6/1988 | Gibellina |
| 4,966,695 A | | 10/1990 | Joshua |
| 8,262,138 B2 | | 9/2012 | Rischen et al. |
| 8,662,542 B2 | | 3/2014 | Werth |
| 8,821,718 B2 | | 9/2014 | Blomberg et al. |
| 9,115,836 B2 | | 8/2015 | Maunder |
| 9,302,415 B2 | | 4/2016 | Vorm et al. |
| 10,571,060 B2 | | 2/2020 | Fujii et al. |
| 2002/0000721 A1 | | 1/2002 | Ohya |
| 2004/0258575 A1 | | 12/2004 | Perry |
| 2005/0133426 A1 | * | 6/2005 | DeMarco .............. B01D 15/22 210/198.2 |
| 2005/0192559 A1 | | 9/2005 | Michels |
| 2006/0002749 A1 | | 1/2006 | Suzuki et al. |
| 2007/0189944 A1 | | 8/2007 | Kirkland et al. |
| 2008/0169646 A1 | | 7/2008 | Werth |
| 2008/0183156 A1 | * | 7/2008 | Yoo .................. A61M 27/00 604/541 |
| 2008/0185843 A1 | | 8/2008 | Roll |
| 2008/0235081 A1 | | 9/2008 | Davison et al. |
| 2008/0319451 A1 | * | 12/2008 | Zacharias ............... A61M 1/77 606/107 |
| 2009/0231066 A1 | | 9/2009 | Rischen et al. |
| 2009/0324447 A1 | | 12/2009 | Brann |
| 2010/0044288 A1 | | 2/2010 | Kitagawa |
| 2010/0071444 A1 | | 3/2010 | Quinn |
| 2010/0101411 A1 | | 4/2010 | Tipler |
| 2011/0089683 A1 | | 4/2011 | Maunder |
| 2012/0093692 A1 | | 4/2012 | Blomberg et al. |
| 2013/0206653 A1 | | 8/2013 | Brann |
| 2015/0167874 A1 | | 6/2015 | Buerli et al. |
| 2015/0290610 A1 | * | 10/2015 | Roose ................ C08F 283/008 522/90 |
| 2016/0158619 A1 | | 6/2016 | Rhinehart |
| 2016/0305586 A1 | * | 10/2016 | Graham ............. F16L 19/0212 |

FOREIGN PATENT DOCUMENTS

| | | |
|---|---|---|
| CN | 105203689 A | 12/2015 |
| CN | 205118523 U | 3/2016 |
| DE | 102008051106 A1 | 5/2009 |
| EP | 2093469 A2 | 8/2009 |
| EP | 2314904 A1 | 4/2011 |
| GB | 1310367 A | 3/1973 |
| GB | 1334486 A | 10/1973 |
| GB | 2248664 A | 4/1992 |
| JP | 2000-097927 A | 4/2000 |
| JP | 2001299907 A | 10/2001 |
| JP | 2002039467 A | 2/2002 |
| JP | 2005257065 A | 9/2005 |
| JP | 2007508103 A | 4/2007 |
| JP | 2008528890 A | 7/2008 |
| JP | 2009257358 A | 11/2009 |
| JP | 2012529650 A | 11/2012 |
| WO | 2006079222 A1 | 8/2006 |
| WO | 2012058515 A2 | 5/2012 |
| WO | 2014043979 A1 | 3/2014 |

OTHER PUBLICATIONS

Great Britain Search Report for GB Application No. 1710279.9 mailed Dec. 22, 2017 (5 pages).
Singapore Written Opinion for SG Application No. 11201912889R, mailed Dec. 11, 2020 (7 pages).
Chinese Office Action CN Application No. 201880055912.5, mailed Mar. 12, 2021 (21 pages with English Translation).
EPO "Office Action" Application No. 18750334.7, mailed Nov. 17, 2021, 60 pages.
European Search Report for EP Application No. 22155869.5, mailed May 18, 2022 (14 pages).
Japanese Office Action for JP Application No. 2019-572123, mailed Jun. 27, 2022 (15 pages).
Korean Office Action for KR Application No. 10-2019-7038506, mailed Feb. 13, 2023 (28 pages, English Translation).
Chinese Office Action for CN Application No. 202210190468.6, mailed Oct. 27, 2023 (28 pages, English Translation).
Japanese Office Action for JP Application No. 2022-210487, mailed Nov. 20, 2023 (10 pages, English translation).
Japanese Office Action for JP Application No. 2024-22817, dated Jul. 16, 2024 (10 pages w/English translation).
European Search Report for corresponding EP Application No. 24205077.1, dated Jan. 17, 2025.
European Office Action for corresponding EP Application 242050771.1, dated Jan. 29, 2025.

* cited by examiner

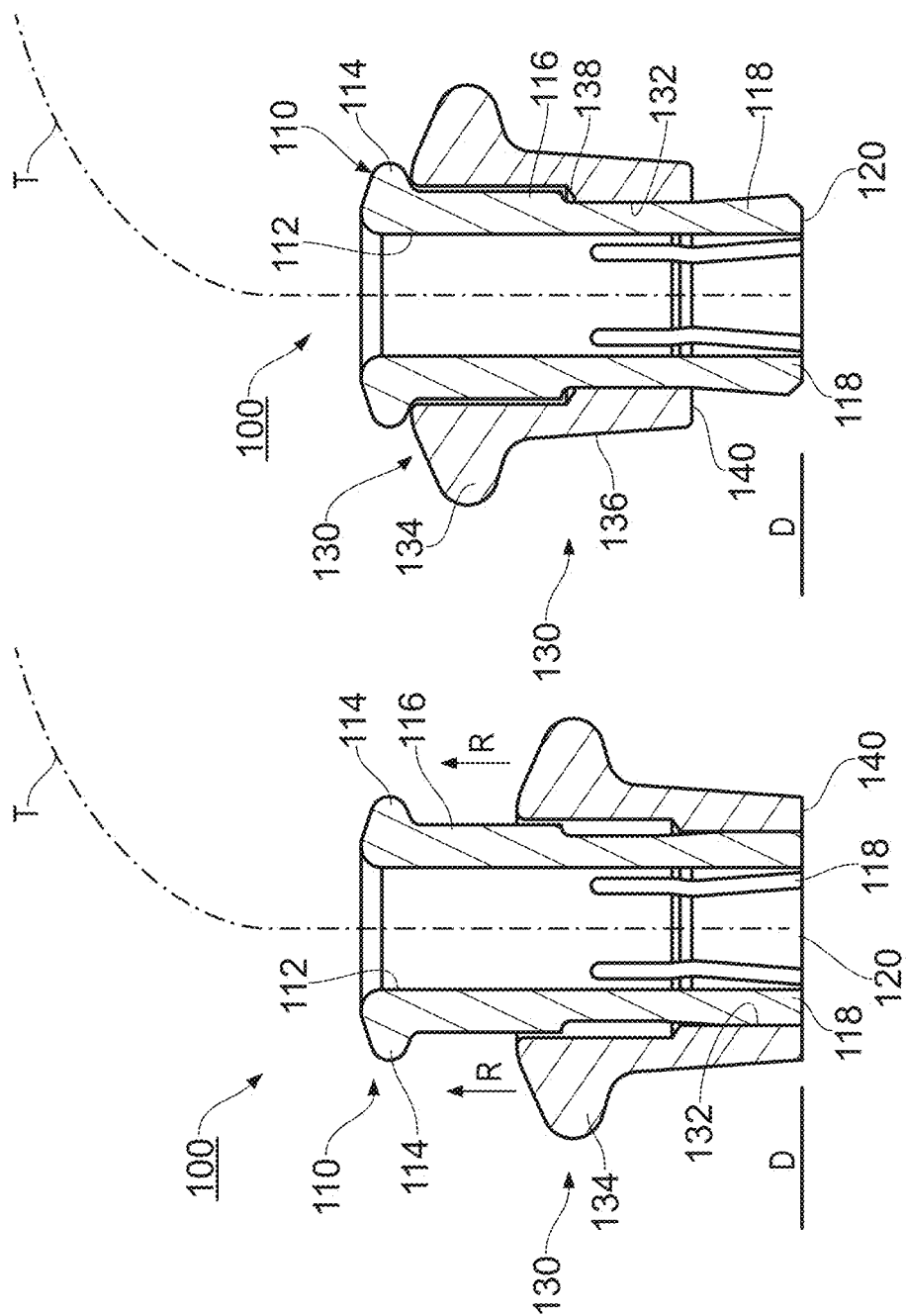

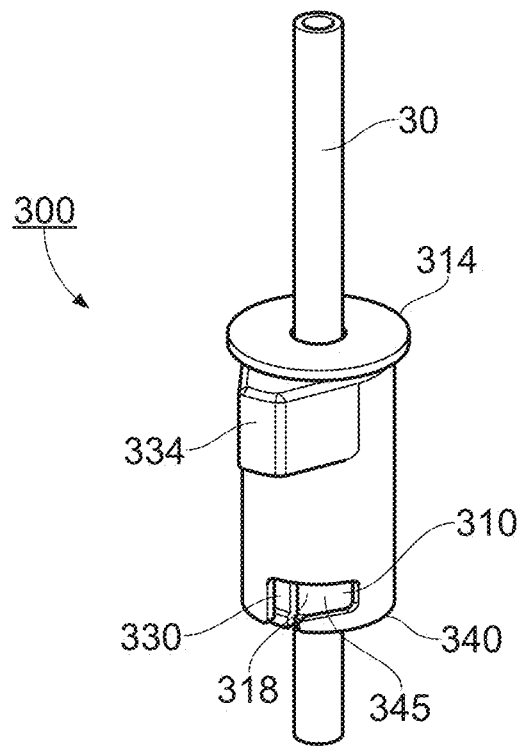
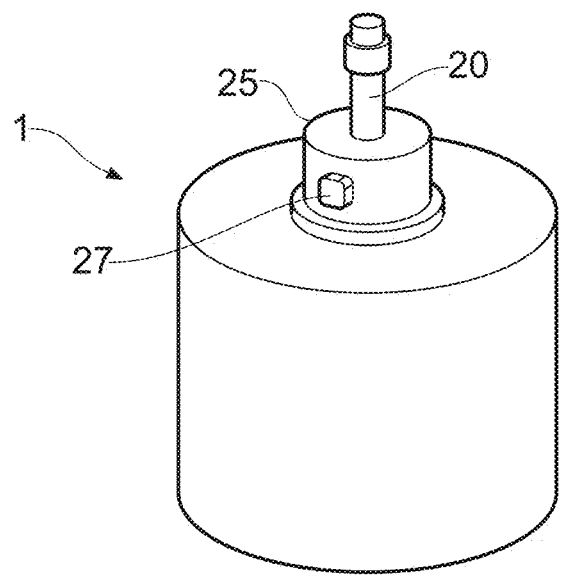
FIG. 10

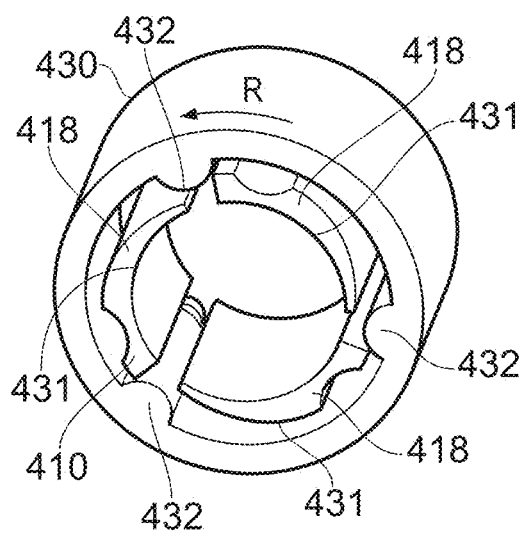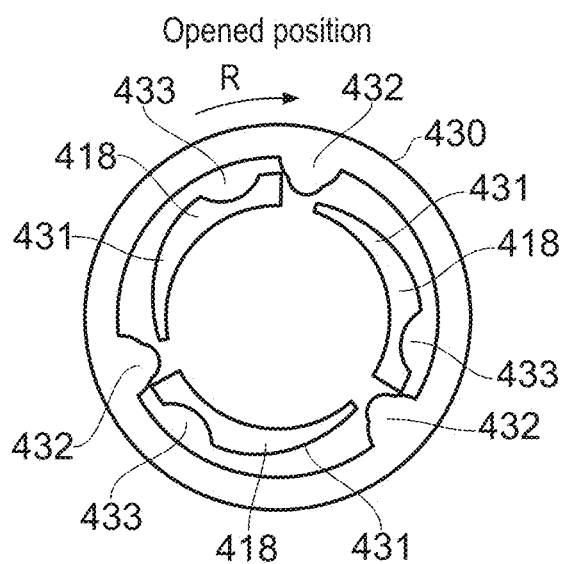
FIG. 13    FIG. 14
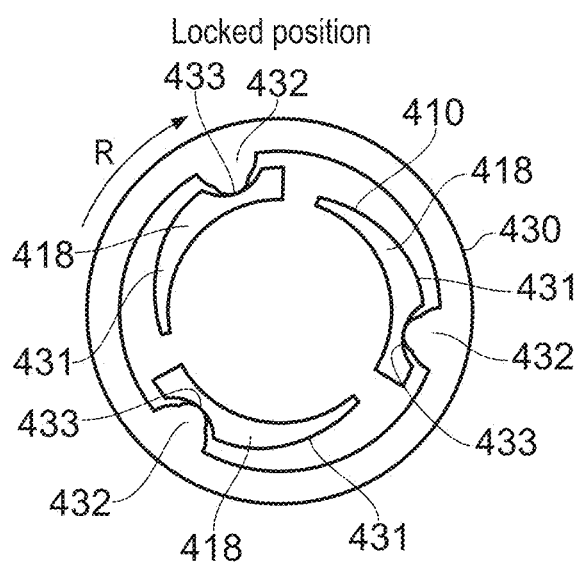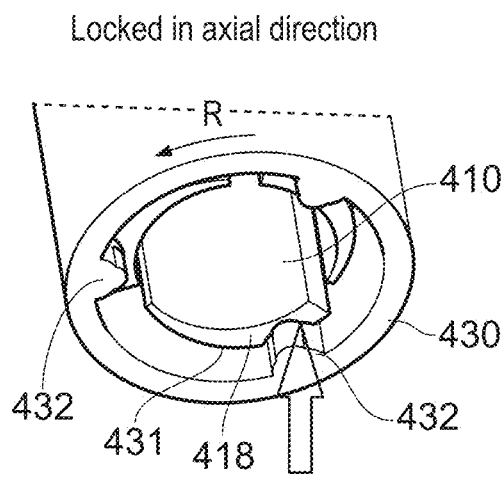
FIG. 15    FIG. 16

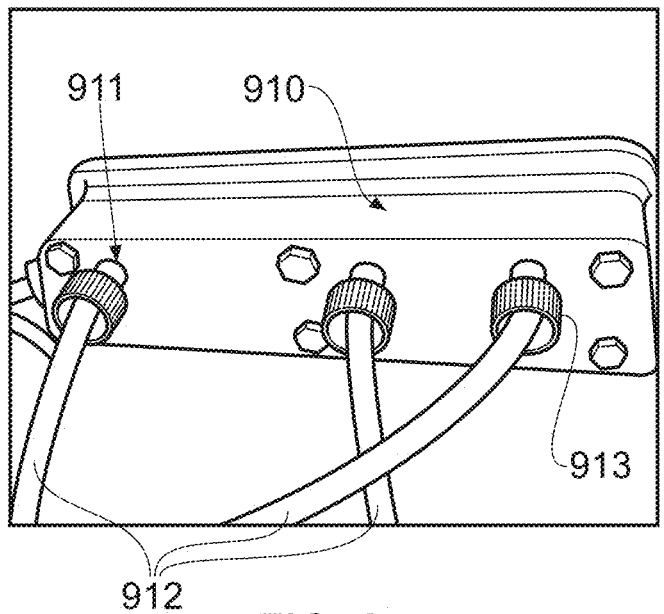
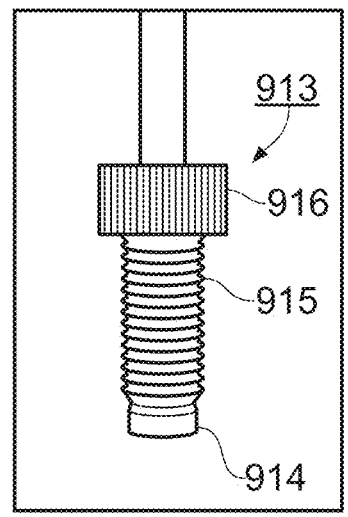
FIG. 25a  FIG. 25b
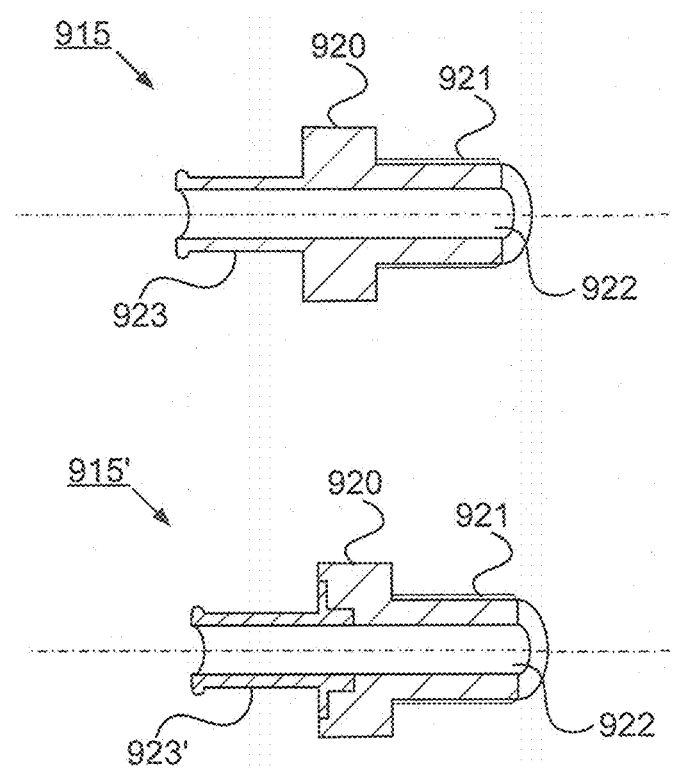
FIG. 26b

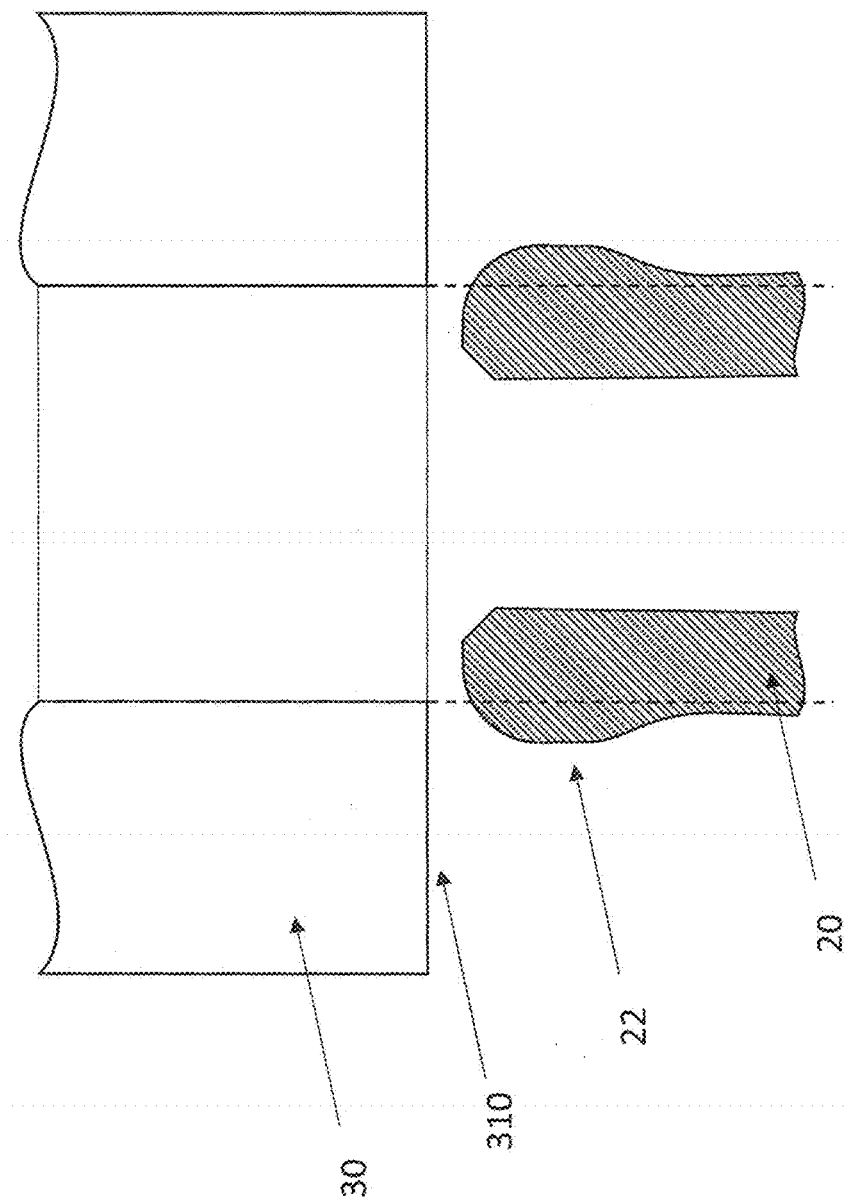

CHROMATOGRAPHY SYSTEM AND COUPLINGS THEREFOR

CROSS REFERENCE TO RELATED APPLICATIONS

This application is a continuation of U.S. application Ser. No. 18/047,190, filed Oct. 17, 2022, which is a continuation of U.S. patent application Ser. No. 16/622,524, filed Dec. 13, 2019, which claims the priority benefit of PCT/EP2018/067498, filed on Jun. 28, 2018, which claims priority to GB Application No. 1800901.9, filed Jan. 19, 2018 and GB Application No. 1710279.9, filed Jun. 28, 2017, the entire contents of which are hereby incorporated by reference herein.

TECHNICAL FIELD

The present invention relates to chromatography systems, such as liquid chromatography systems, in particular but not exclusively to a laboratory or 'benchtop' size system of a versatile nature allowing convenient reconfiguration for different chromatographic procedures and convenient automated use, and reconnectable fluid tubing couplings for connecting tubing and the like, associated with such equipment or systems.

BACKGROUND

Reconnectable fluid tubing couplings i.e. those couplings that can be removed and replaced multiple times and yet still provide a fluid seal at each reconnection for flexible tubing such as garden hoses and plastics plumbing are known. However, their ease of connection and/or hygiene are questionable particularly if the same designs were to be employed with chromatography systems, where sanitary couplings are required and where, often, much higher fluid pressure is encountered, for example up to 20 Bar or above. Typical plumbing fittings used in chromatography systems have multiple components comprising metal springs and O-rings and so have resultant dead-ends or O-ring grooves, which can harbour unwanted contaminants, for example pathogens, in use. These dead-ends and grooves are difficult to sanitise. Further, the use of metal parts is problematic when gamma irradiation is attempted to sanitise such a coupling assembly. In additional the use of screw threads or special tools is undesirable where speed and ease of connection or disconnection is sought.

One prior art barb lock tubing coupling arrangement is shown in U.S. Pat. No. 8,662,542, but that coupling requires tooling for assembly and is not intended to be readily releasable.

Liquid chromatography is a well-known procedure for separating mixtures of molecules, for example separating proteins in liquid samples. The proteins may typically be suspended in a fluid, and driven through a chromatography separation medium along with a buffer solution. The various sample molecules of the mixture travel at different speeds through a chromatography medium, causing them to separate. This separation may be completed by a fractionation step where the mobile phase may be directed to different containers, e.g. by an outlet valve of the chromatography system.

Also, in chromatography system, particularly benchtop experimental equipment it is often necessary to cleanse the equipment comprising interconnecting tubing in use, and then tear down the tubular set-up, in order to remake the tubing in a different configuration, to accommodate a different experiment. Thus, special sanitisation equipment is inconvenient, and speedy cleaning is needed, along with fast disconnection and reconnection. One such piece of equipment is disclosed in U.S. Pat. No. 8,821,718, incorporated herein by reference, where interchangeable modular components of a chromatography system are interconnectable by external fluid conduits, and which would benefit from an improved means of such interconnection.

SUMMARY OF THE INVENTION

An object of embodiments of the invention is to provide chromatography system, particularly liquid chromatography system, which comprises releasable fluid couplings which can be quickly reconnected, without screwing, or twisting fluid conduits, or requiring space around each fluid conduit to undertake such actions. It is also an object of the present invention is to provide a chromatography system with one or more of: an increased functionality, for example able to operate in conventional batch chromatography as well as continuous chromatography; is useable across a wider range of applications; does not have a substantially increased overall size or manufacturing cost; and is simple to operate.

Another object of embodiments of the present invention is to provide an easily cleanable coupling with no, or limited, dead-ends or other spaces where contaminants can accumulate. Another object of embodiments of the invention is to provide a coupling which can be connected and released quickly without the use of tools if needed.

According to one aspect of the invention, there is provided chromatography system according to the claims herein.

According to another aspect of the invention, a releasable coupling is provided as defined by further claims herein, which coupling can be used as part of a coupling assembly, for example in chromatography system such as a benchtop chromatography system, where modular components can be rearranged on a support for example to best suit a particular experimental set-up, and where the arranged modular components are interconnectable by fluid tubing, the tubing having opposed ends, each end comprising one of the coupling assemblies according to the invention, for fluid coupling of respective modular components.

Other preferred aspects of the invention are recited in the dependent claims herein.

More advantages and benefits of the present invention will become readily apparent to the person skilled in the art in view of the detailed description below.

DRAWINGS

The invention will now be described in more detail with reference to the appended drawings, wherein:

FIG. 2 shows in section the coupling of FIG. 1 in a fluidically connecting condition;

FIG. 3 shows the same coupling in section in a releasable condition;

Figure 4:
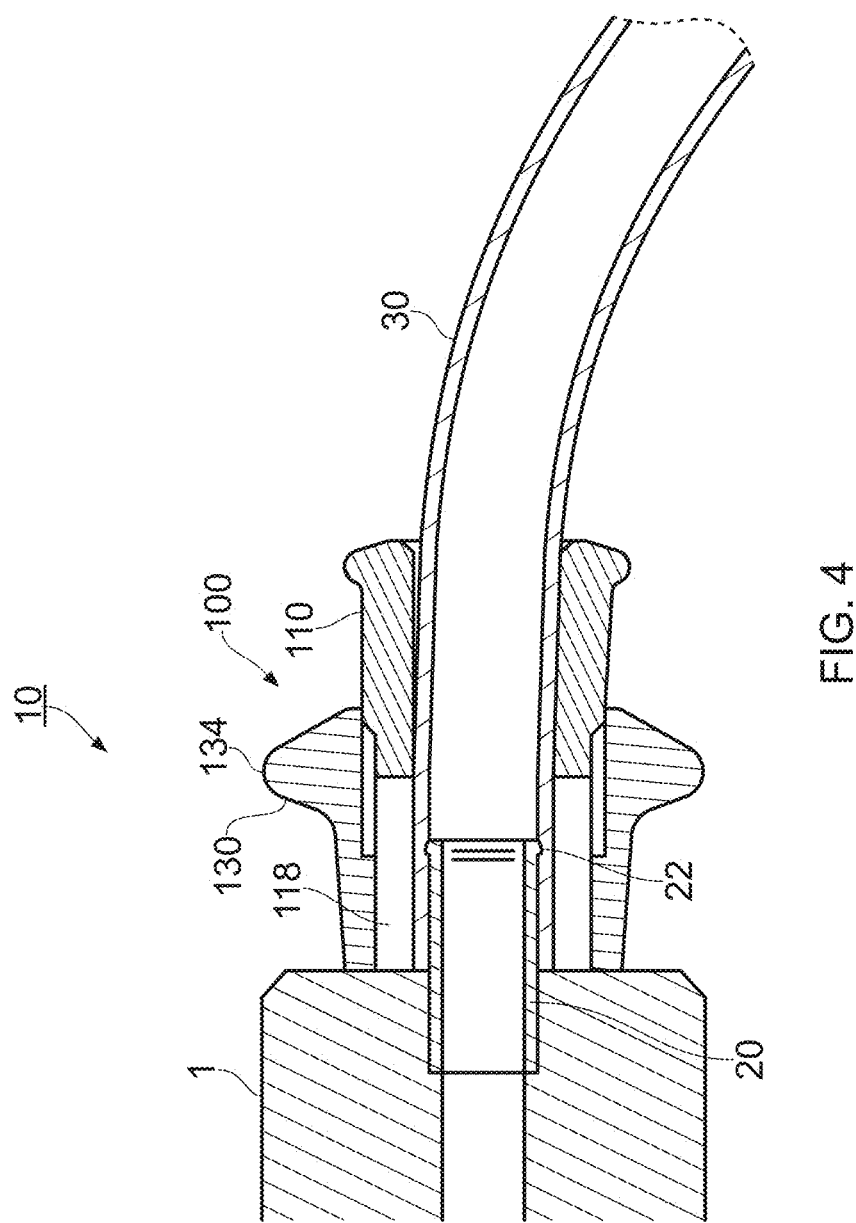
FIG. 4 shows a coupling assembly in section comprising the coupling of FIG. 1 all in a fluidically sealed condition.
Figure 5:
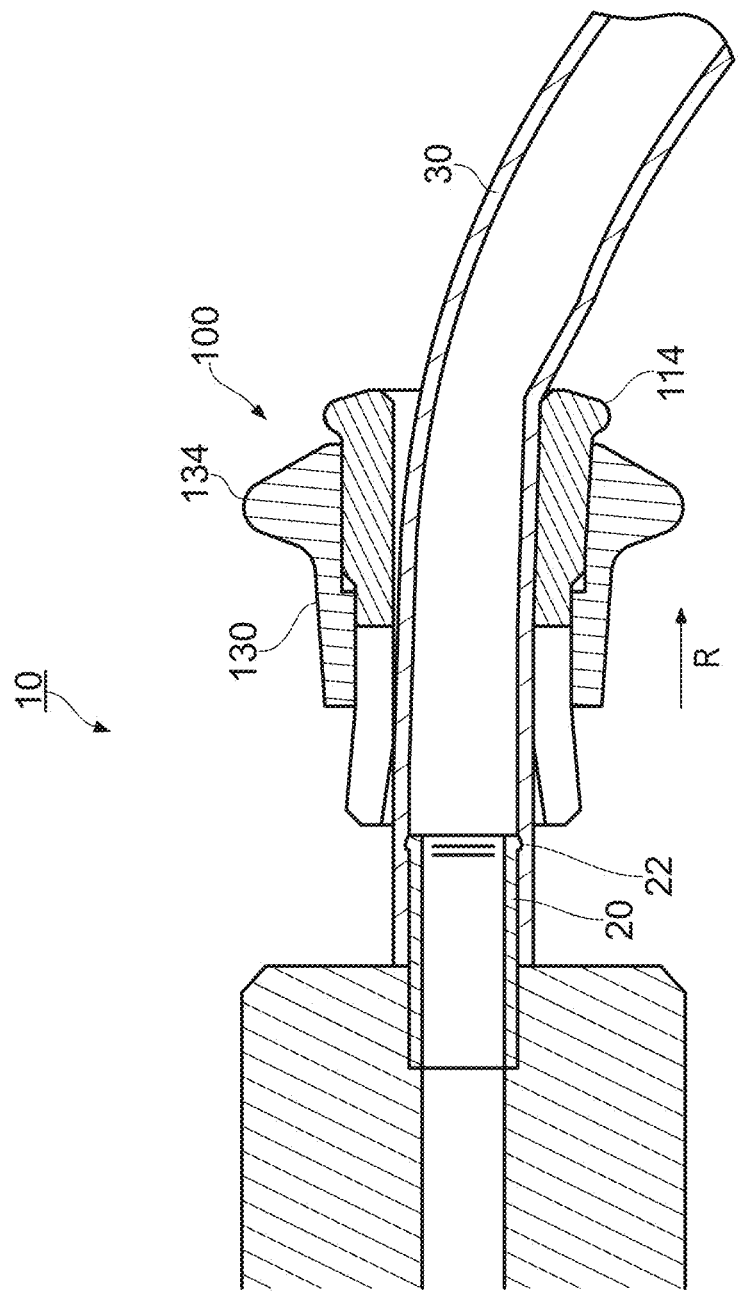
Figure 6A:
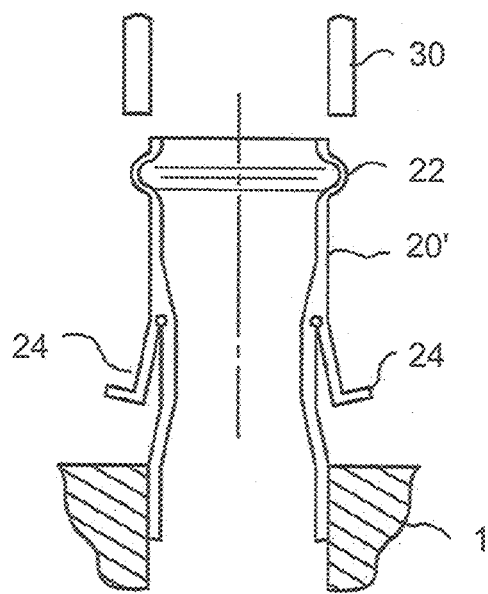

FIG. 5; shows a sectional view through the coupling assembly of FIG. 4, but reconfigured into a releasable condition;

FIGS. 6a, b and c show a modification of the above coupling assembly.

Figure 7A:
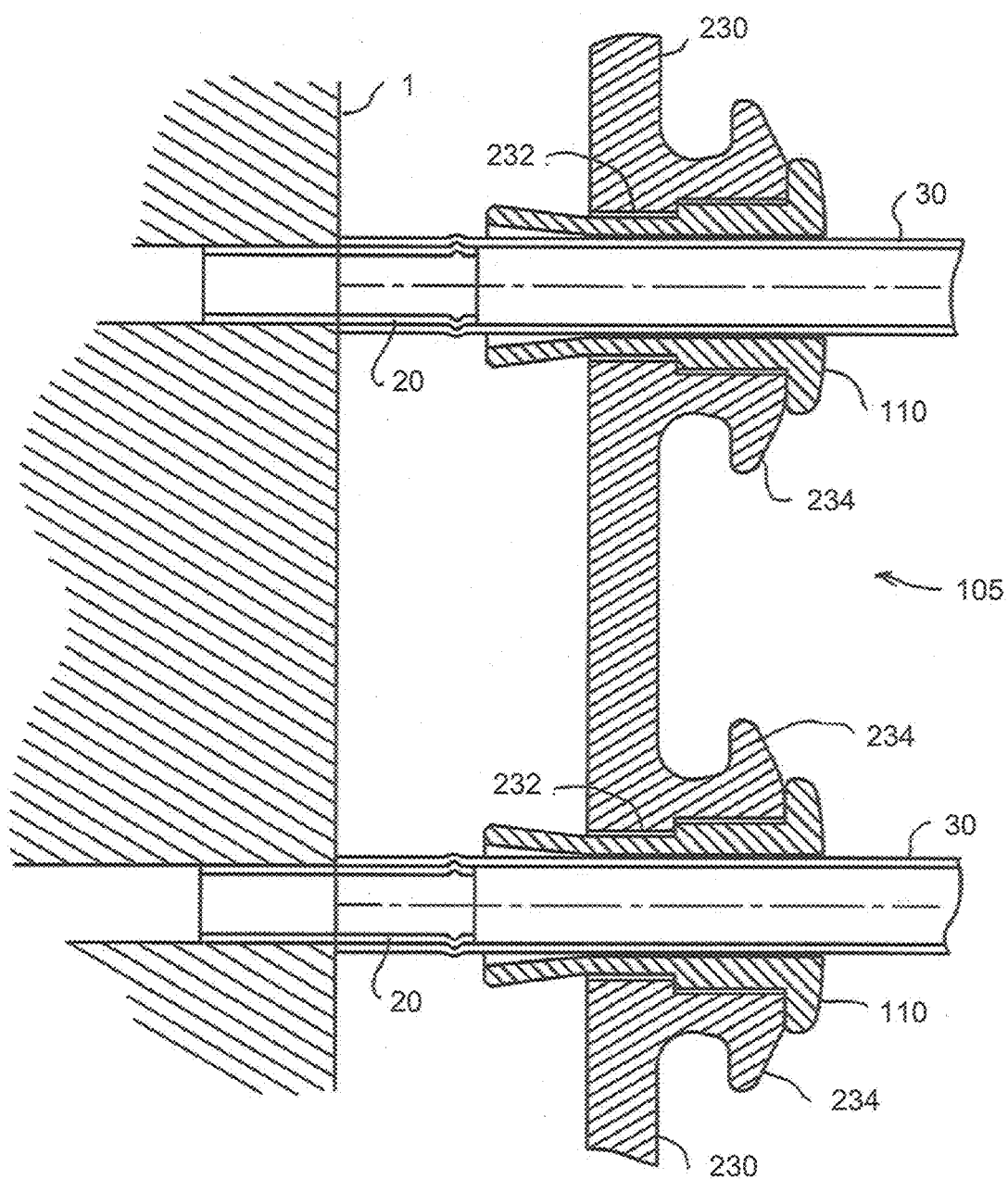
Figure 8:
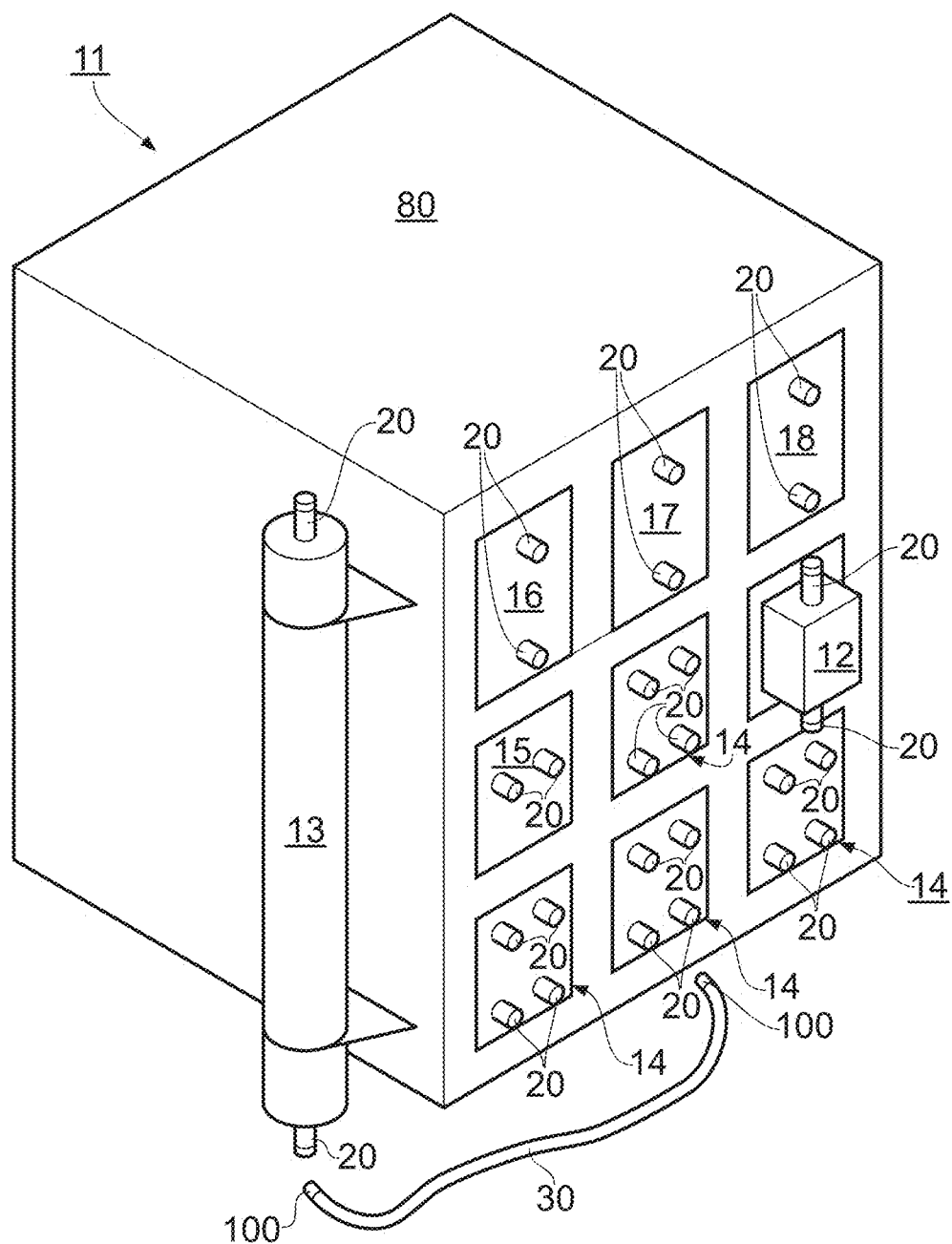
Figure 9:
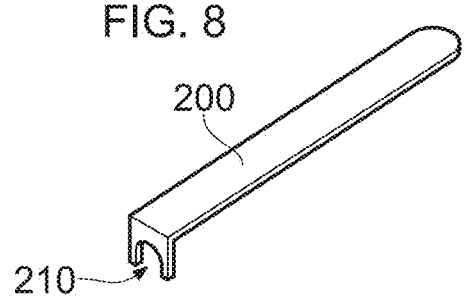
Figure 11:
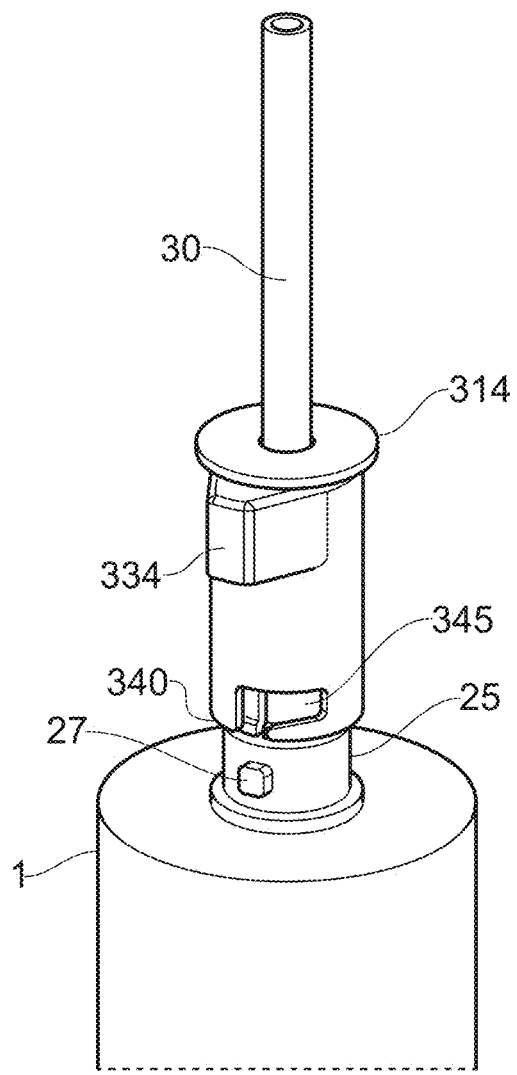
Figure 12:
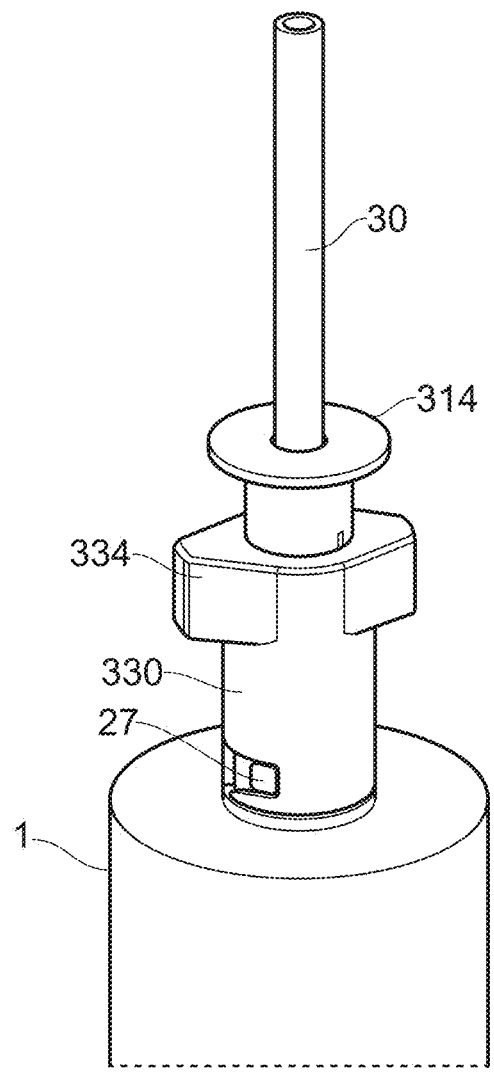
Figure 17:
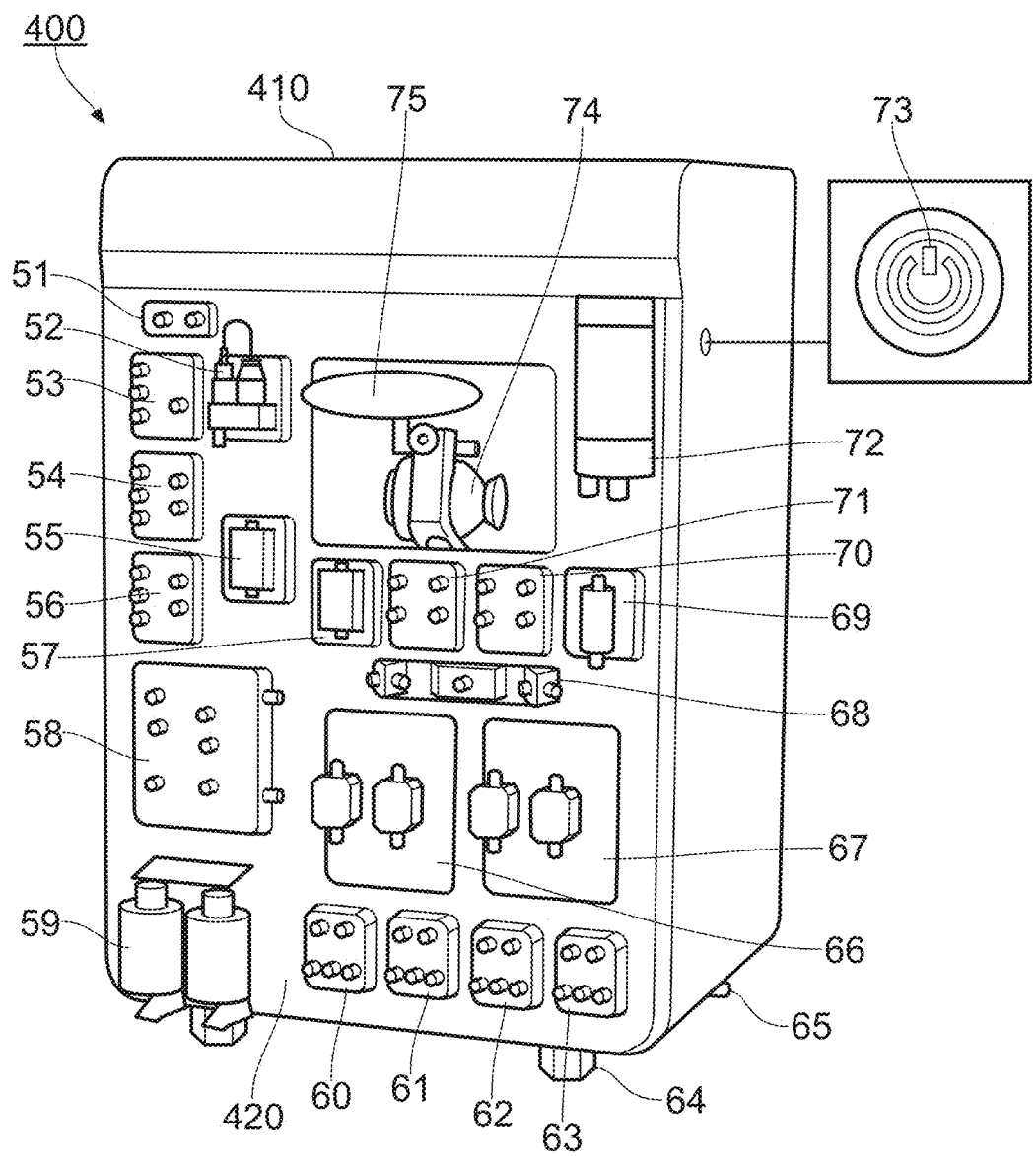
Figure 18:
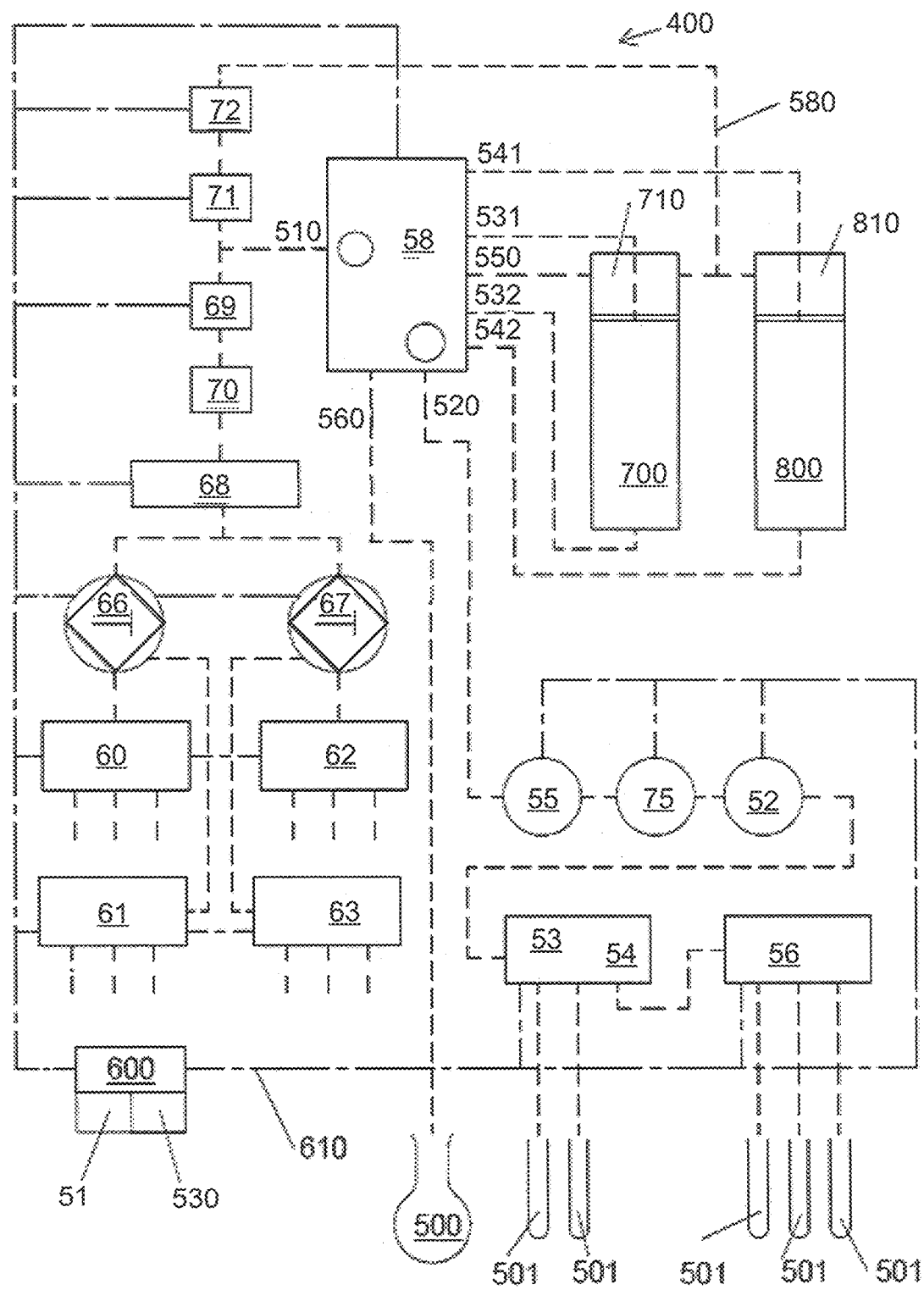
Figure 19:
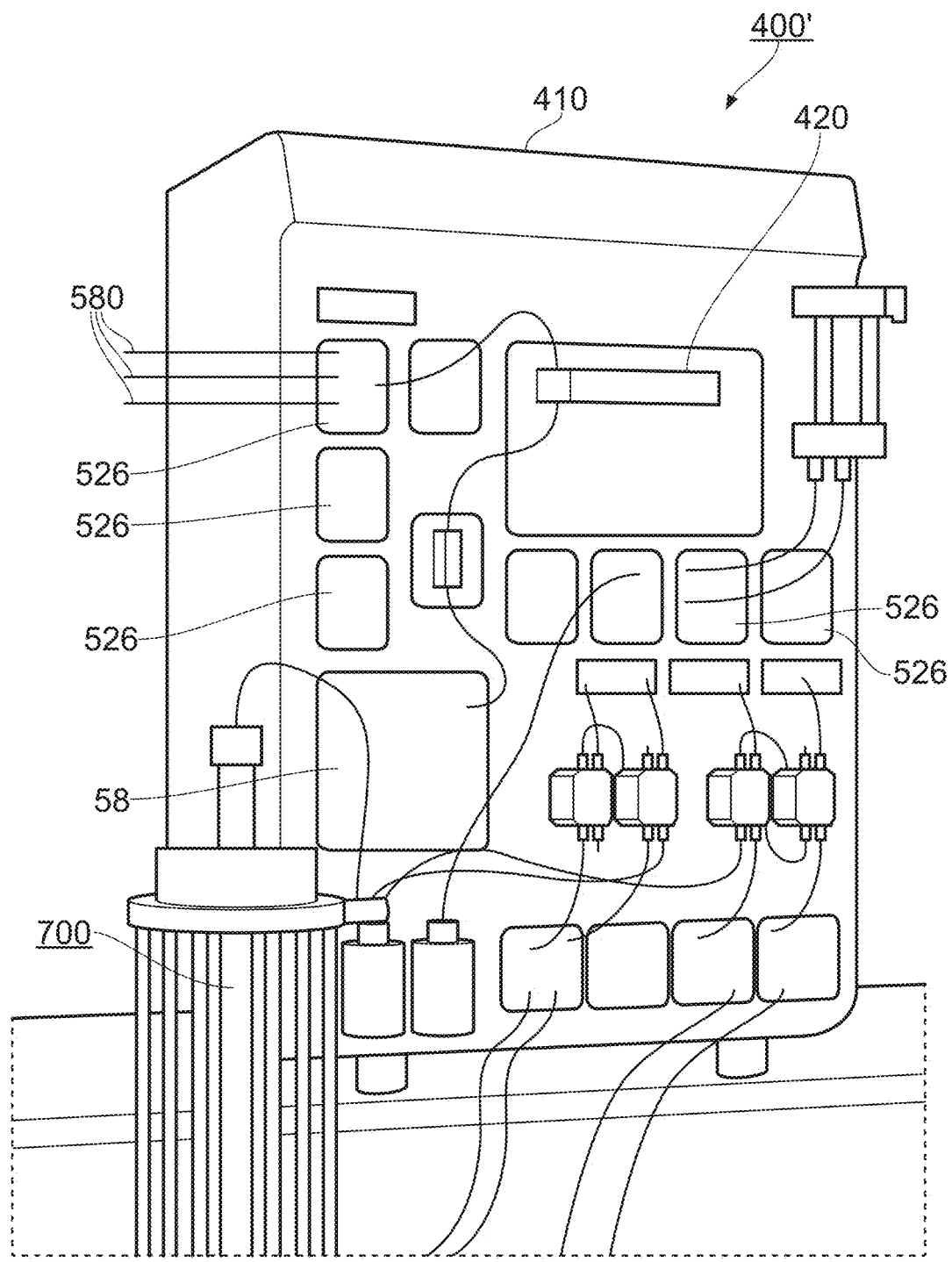
Figure 20:
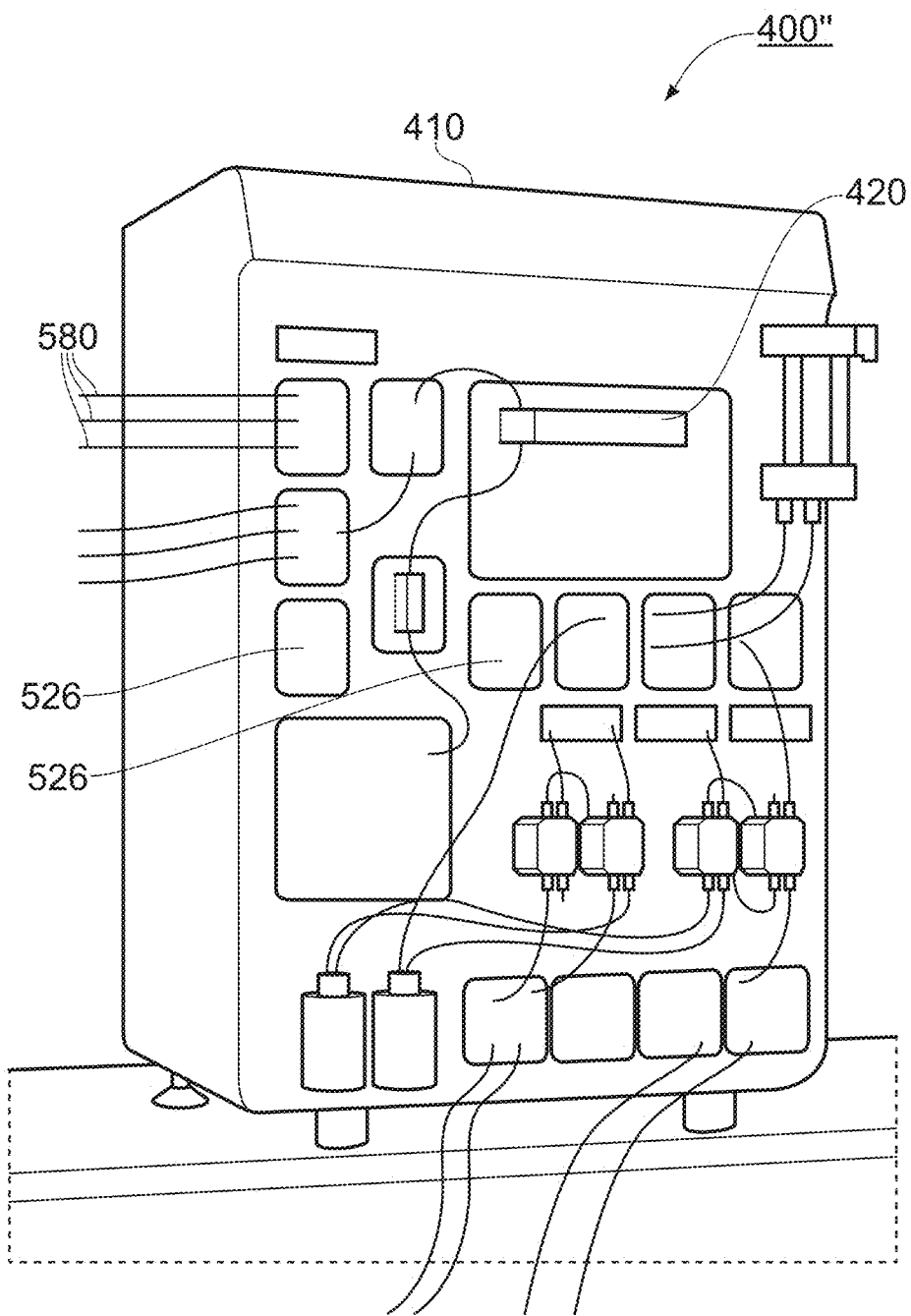
Figure 21:
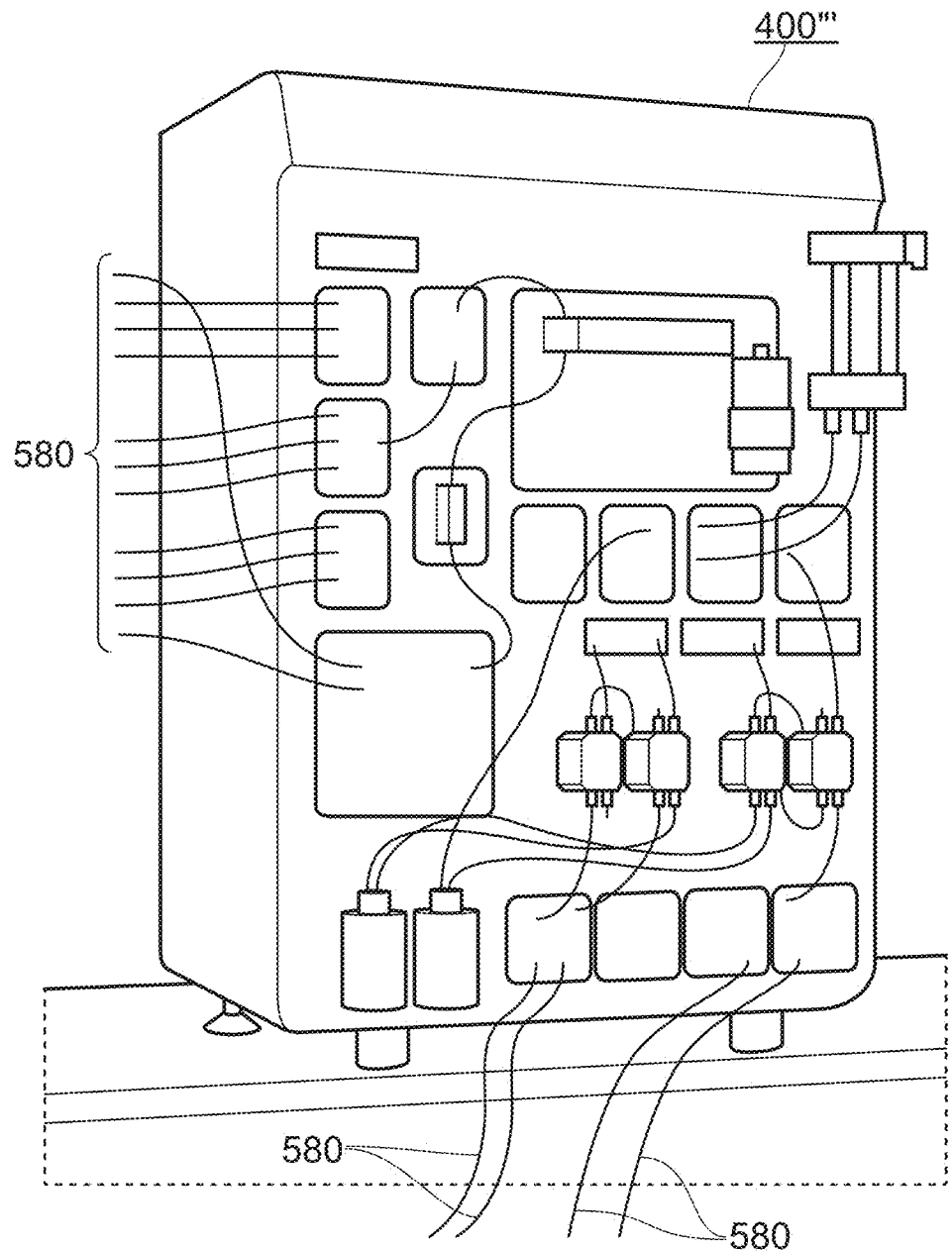
Figure 22:
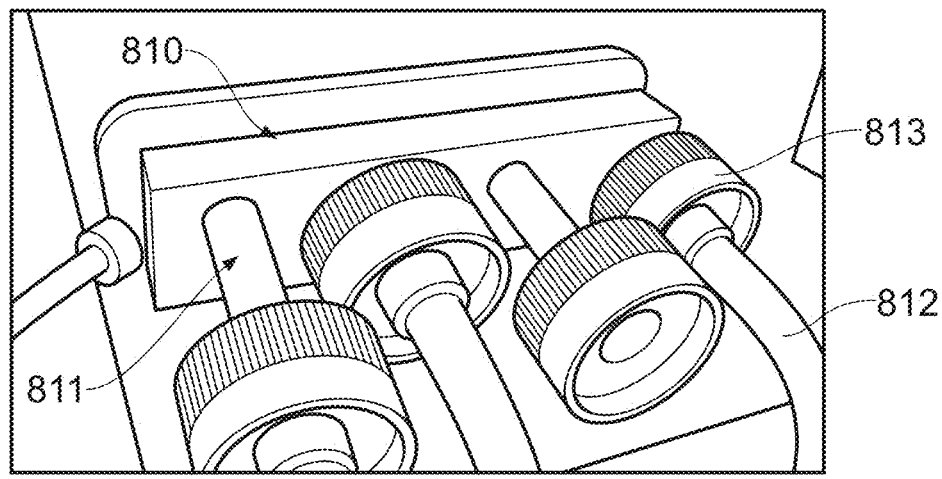
Figure 23:
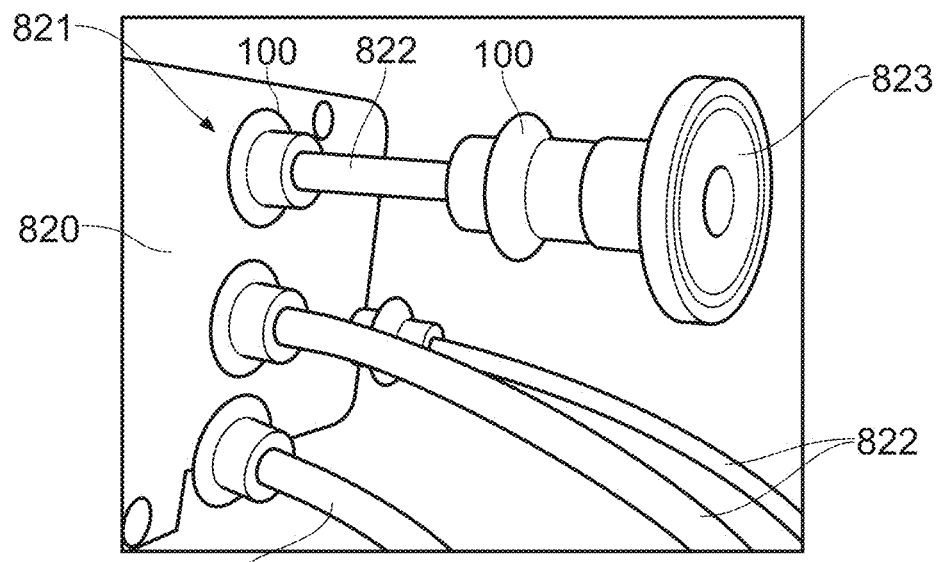
Figures 24A, 24B:
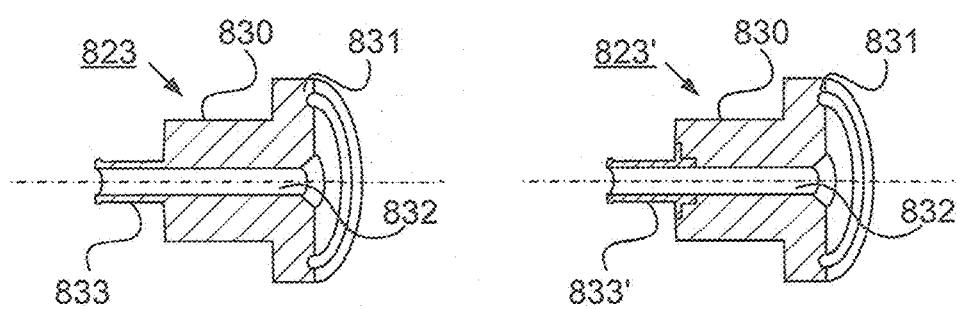

FIGS. 7a, b, c and d show modifications of a coupling assembly;

FIG. 8 shows chromatography system employing plural coupling assemblies;

FIG. 9 shows a coupling release tool;

FIGS. 10, 11 and 12 show embodiments of the invention comprising a bayonet locking feature;

FIGS. 13 to 16 show a variant of components of a coupling;

FIG. 17 shows a pictorial view of a chromatography system;

FIG. 18 shows schematic representation of the chromatography system shown in FIG. 17;

FIGS. 19, 20 and 21 show configurations of the chromatography system shown in the FIGS. 17 and 18;

FIG. 22 illustrates a first version of a prior art modular component provided with four ports;

FIG. 23 illustrates a modular component provided with four ports;

FIGS. 24a and 24b show cross-sectional views of two variants of a converter;

FIG. 25a shows a second version of a prior art modular component provided with three ports;

FIG. 25b shows a threaded connecter for the modular component of FIG. 25a.

Figure 27:
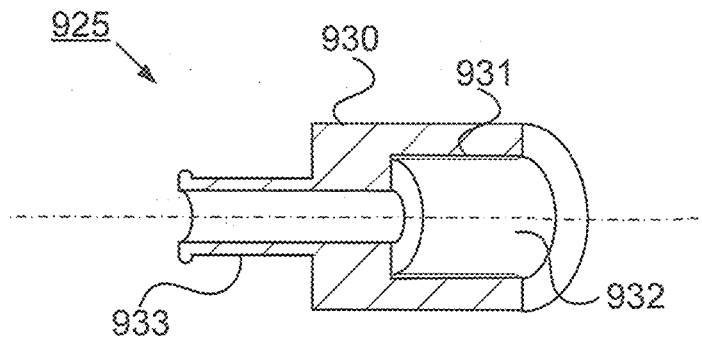
Figure 28A:
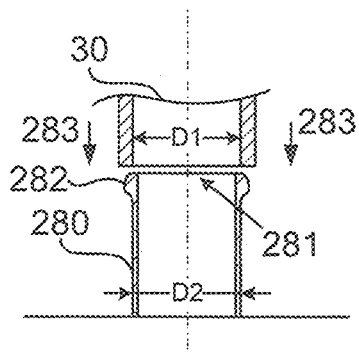
Figure 28B:
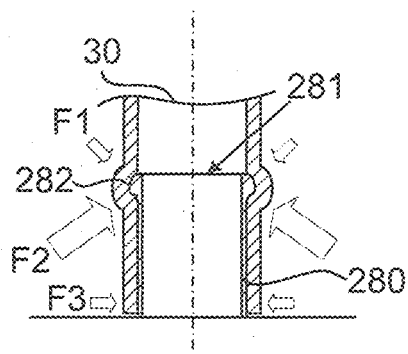
Figure 29A:
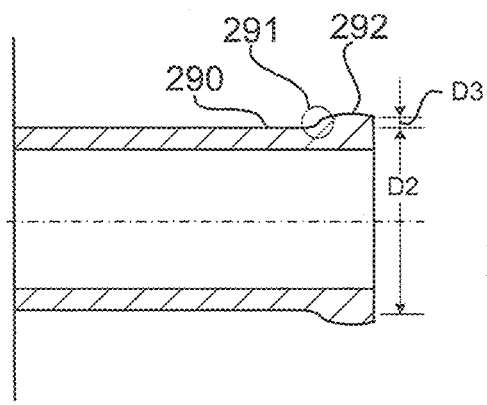
Figure 29B:
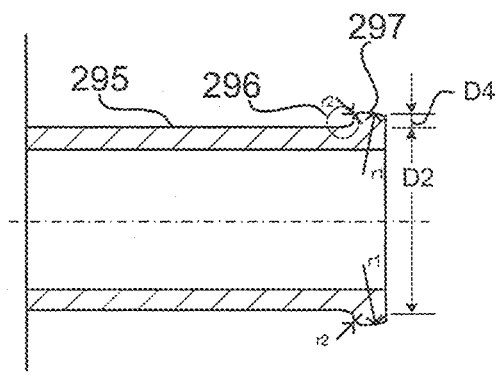
Figure 30B:
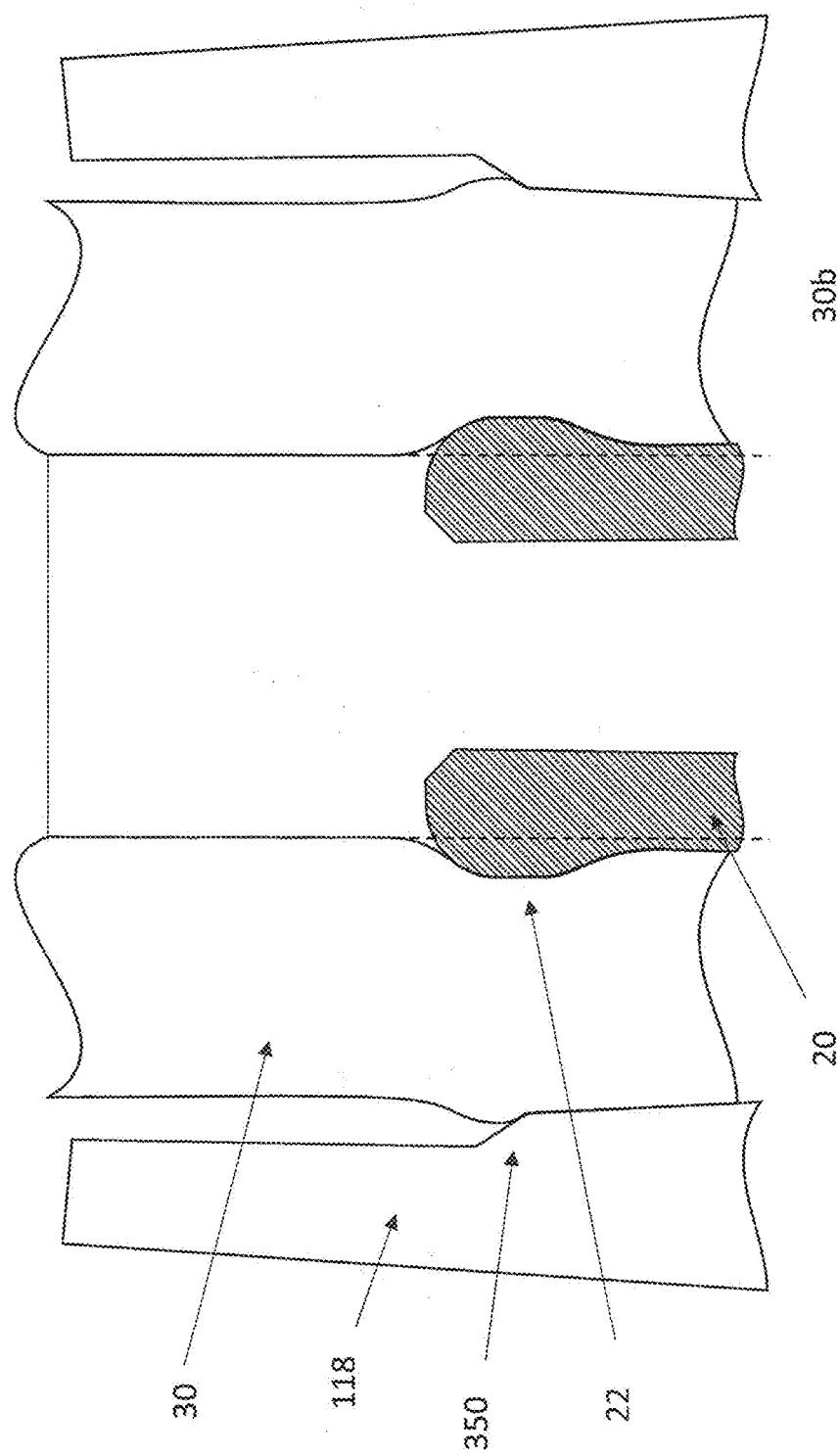
Figure 30C:
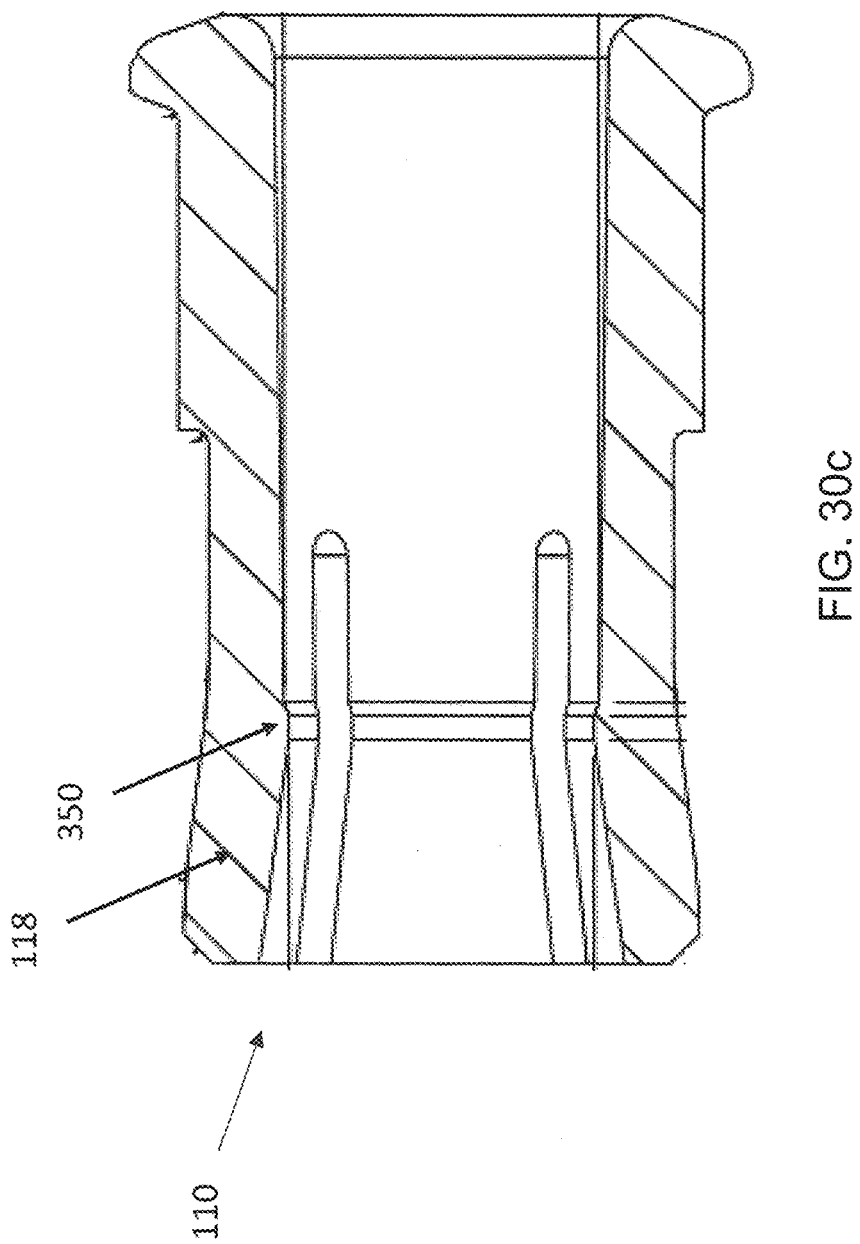

FIGS. 26a and 26b show cross-sectional views of adaptors;

FIG. 27 shows an alternative converter;

FIGS. 28a and 28b show a cross-sectional view of a spigot with mounted tubing;

FIGS. 29a and 29b show cross-sectional views of alternative sealing ridge configurations; and FIGS. 30a-30c show cross-sectional views of one embodiment of the sealing configuration.

DETAILED DESCRIPTION

Good Manufacturing Practice (GMP) sets out guidelines for bioprocessing procedures, which if followed require cleanliness standards. Advantageously, the standards are easier to achieve with the proposed apparatus, for example where fluid paths in the system have, in one configuration at least, a continuous flow path with no substantive stagnant portions, thereby providing complete cleaning without the need to break down the fluid conduits. Embodiments of the proposed system provide a sanitary small-scale chromatography system suitable for both GMP and non-GMP work. Functionally wide flow and pressure ranges of the system makes it fit for both production of technical batches and scale-up studies as well as small-scale production of GMP-grade material. The high accuracy and flow range of the pumps enables precise gradient formation, covering a large range of chromatography column sizes and more repeatable results.

In embodiments, a modular construction provides increased functionality, for different uses. Interactive control software allows changes to be made in real-time and unexpected deviations to be quickly identified. The small, benchtop size frees up lab space. The system allows in-situ column packaging, i.e. the ability to compress chromatography media in the column, or each column where two or more columns are used, whilst being connected to the system, and without having to then disconnect any fluid conduits prior to performing chromatographic procedures.

Figure 1:
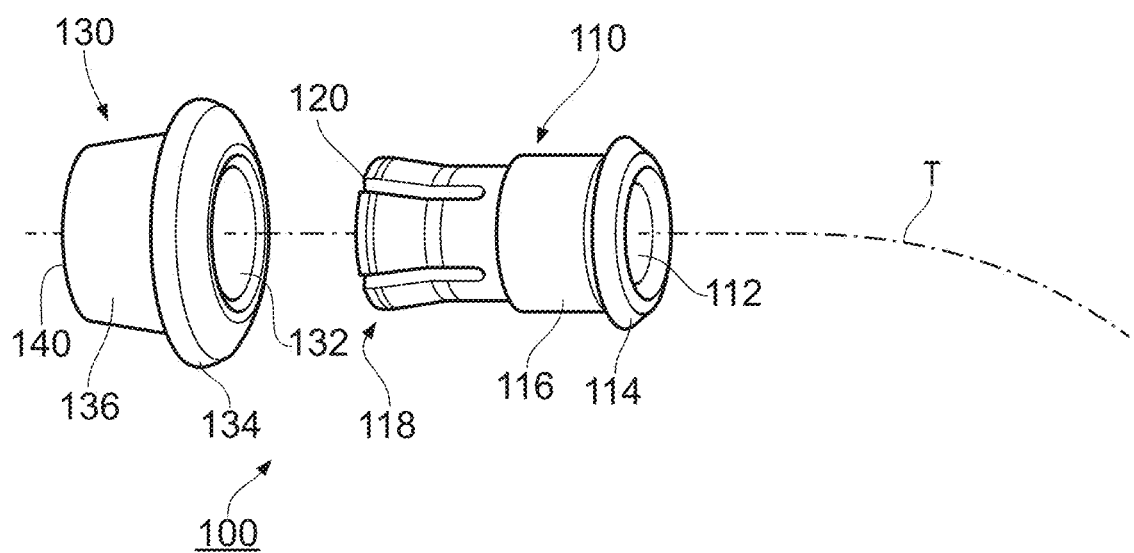
FIG. 1 shows an exploded view of the coupling components.

FIG. 1 shows an exploded view of an embodiment of a releasable coupling 100 according to one embodiment. The coupling 100 comprises two parts: a cylindrical inner component, in the form of a collet 110 for accepting a fluid tubing; and a cylindrical locking collar 130 having and internal through-aperture 132 for slideably accepting the collet 110. A fluid tubing (not shown) will extend in use along an axis T, and within a central bore 112 within the collet 110 of a size which snuggly fits around the tubing. The collet 110 has a collet flange 114, formed on a cylindrical mid portion 116 and plural resiliently deflectable and circumferentially arranged fingers 118 extending from the mid portion 116 to a distal end 120 of the collet 110.

The collet 110 is a sliding fit in a through-aperture 132 of the collar 130, and the collar 130 is thereby mountable over and around the fingers 118 and mid portion 116 of the collet 110. The collar 130 can be manipulated along the fingers 118 and mid portion 116 to selectively deflect or relax the fingers 118, which deflection causes gripping of the tubing, as described in more detail below. Manipulation of the collar 130 is assisted by a collar flange 134 at a distal end of the collar, extending from a body 136 of the collar which can be pulled or pushed manually. The collar has a distal end 140. The fingers 118 flare outwardly toward the distal end 120 of the collet, thus it will be appreciated that if the aperture 132 is of a generally constant internal diameter, then sliding of the collar 130 in a direction from the collet flange 114 to the distal end 120 of the collet 110 will cause the internal diameter of the aperture 132 to abut outer surfaces of the fingers 118 and force them inwardly to provide a tubing clamping action.

FIG. 2 shows the coupling 100 of FIG. 1 in section, arranged in a tubing clamping position. Here, the distal end 140 of the collar 130 and the distal end 120 of the collet 110 are have been manipulated into alignment by means of manual repositioning of the collar flange 134 relative to the collet flange 114. In that position the inner surface of aperture 132 and an outer surface of the fingers form complementary surfaces which abut and thereby cause deflection of the fingers 118 inwardly toward the axis T for inwardly urging an adjacent portion of a tubing (not shown) inside the collet, for example to compress, or squeeze or clamp the tubing. Release of the coupling is achieved manipulating the collar and its flange in the direction of arrows R.

FIG. 3 shows the coupling 100 again in section and arranged in a tubing releasing position. Here, the collar 130 has been slid in the direction R toward a distal end of the collet, but it is prevented from sliding off the collect by the collet flange 114 and/or a step 138 in both the aperture 132 and the bore 112, one or each of which form a stop. In that position, the fingers 118 are relaxed and spring resiliently outwardly to cease or reduce any urging/compressing/clamping action on the tubing. The position shown in FIG. 3 is achieved by manipulation of the collar 130 and its flange 134 in the direction of arrow R (FIG. 2) relative to the collet 110.

FIG. 4 shows a section through a coupling assembly 10 comprising a male part, in this case in the form of a connector spigot 20, the male part having a widening, e.g. a sealing ridge, a bead or a barb, 22 which is positionable inside a flexible fluid tubing 30 beyond an open end of the tubing 30 as a push fit. The tubing 30 is held to the spigot 20 by compression of the tubing 30 onto the spigot 20. The coupling 100 surrounds the tubing 30 and provides the releasable compression of the tubing onto the spigot 20, in the manner described above principally in relation to FIG. 2, for releasably holding the tubing 30 to the spigot 20. In this Figure, it is clear that the fingers 118 compress the tubing 30 behind the widening 22, thereby assisting the holding of the tubing to the spigot, and effectively locking the tubing to the spigot 20. The coupling assembly 10 can supply fluid to or remove fluid from a module 1 which in this embodiment is a chromatography system which requires a releasable fluid coupling that can be cleaned easily and that will not harbour contamination. In another embodiment, the fluid pressure at the module 1 could be measured or adjusted via the fluid tubing 30, and so only fluid communication is needed. It follows that fluid flow within in the tubing 30 is not essential.

FIG. 5 shows the same section as in FIG. 4, but in this view having the coupling assembly 10 in a releasing position, as shown in FIG. 3. In use, the coupling 100, positioned according to FIG. 4 will clamp the tubing 30 in place on the spigot 20, and when the collar flange 134 is pulled in the direction of arrows R, the compression on the tubing is released. That release allows the collar flange 134, the collar 130 and the collet 110, to be withdrawn along the tubing in the direction of arrow R in FIG. 5. As described above the collet has a stop or stops (collet flange 114 and/or step 138), which prevent the collar from coming off the collet, and thereby allow the collet to be withdrawn with the flange 134. In that withdrawn position, the tubing 30 can be pulled off the spigot 20 with ease. Connection or reconnection of the tubing 30 onto the spigot is carried out by reversing the above mentioned steps. I.e. the tubing 30 is fitted over the spigot 20, the collet flange 114 is pushed in the opposite direction to arrow R, and once the distal end 120 of the collet is firmly seated against the module 1, the collar flange 134 is pushed home to deflect the fingers 118 against an outer surface of the tubing for clamping the tubing onto the spigot 20.

The coupling 100 is preferably formed from just two plastics material mouldings. From the drawings, it can be seen that the outer surface of the collar 130 is smooth, i.e. the collar flange 134 is a continuous annular formation upstanding from the annular body 136, and the collar flange and an outer surface of the collar on which the collar flange is formed has a continuously curved profile with no sudden changes in direction. Thereby, the chances of contamination of the coupling in use are reduced and the coupling can be easily cleaned. Additionally, two fingers of a user can be used, one on each side of the collar body 136 to hold each side of the collar flange to pull it in the direction of arrow R (FIG. 5). At the same time the user's thumb can be used to react such a pulling force by resting the thumb against the collet flange 114 opposing the two fingers.

Figure 6B:
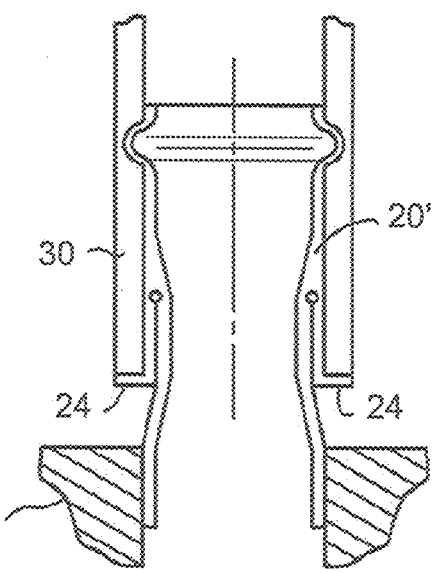
Figure 6C:
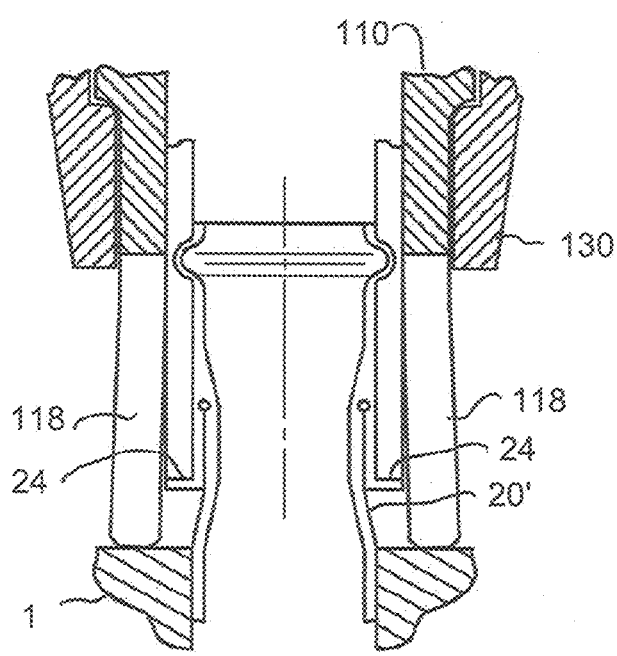

It is important to ensure that the tubing 30 is substantially fully fitted over the spigot 20. To that end the collet 110 and collar 130 can be formed from transparent plastics. Additionally, the spigot can be a different colour to the tubing to provide a visual colour indication where the tubing is not fully overlapping the spigot if any of the spigot's colour can be viewed. One modification of the embodiment shown in FIGS. 1 to 5 is shown in FIGS. 6a, 6b, and 6c wherein: FIG. 6a shows a modified spigot 20' which has resilient projections 24, e.g. resilient arms, extending outwardly; FIG. 6b shows a tubing 30 pushed fully home onto the spigot 20'. When the tubing is fully home on the spigot, the arms 24 move inwardly, only then allowing the collet fingers 118 to be pushed over the tubing as shown in FIG. 6c, ready for the collar 130 to be forced over the fingers for clamping the tubing in place as described above. Without the spigot 20' being fully inserted into the tubing 30, the collect 110 will not pass the arms 24.

Figure 7B:
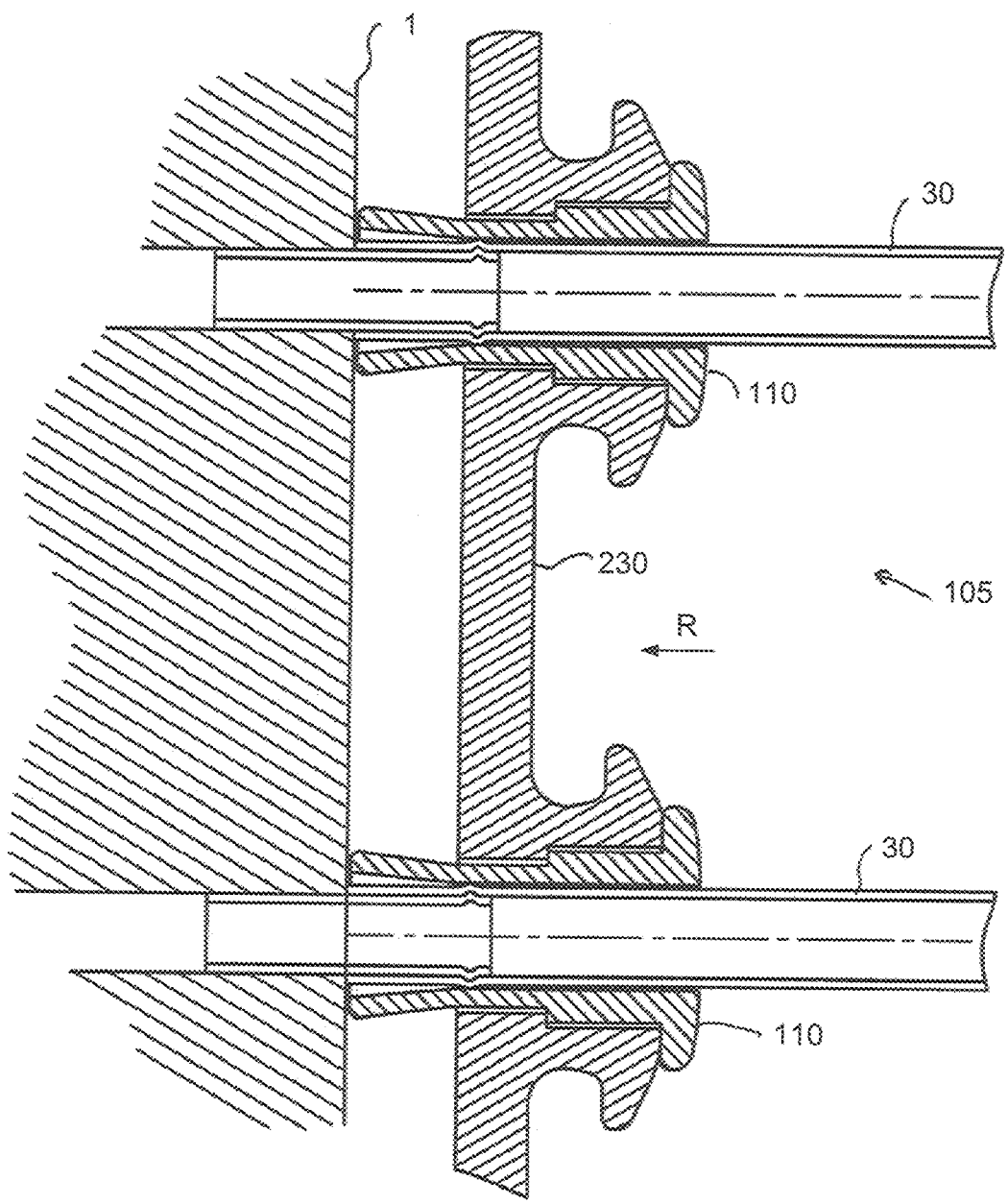
Figure 7C:
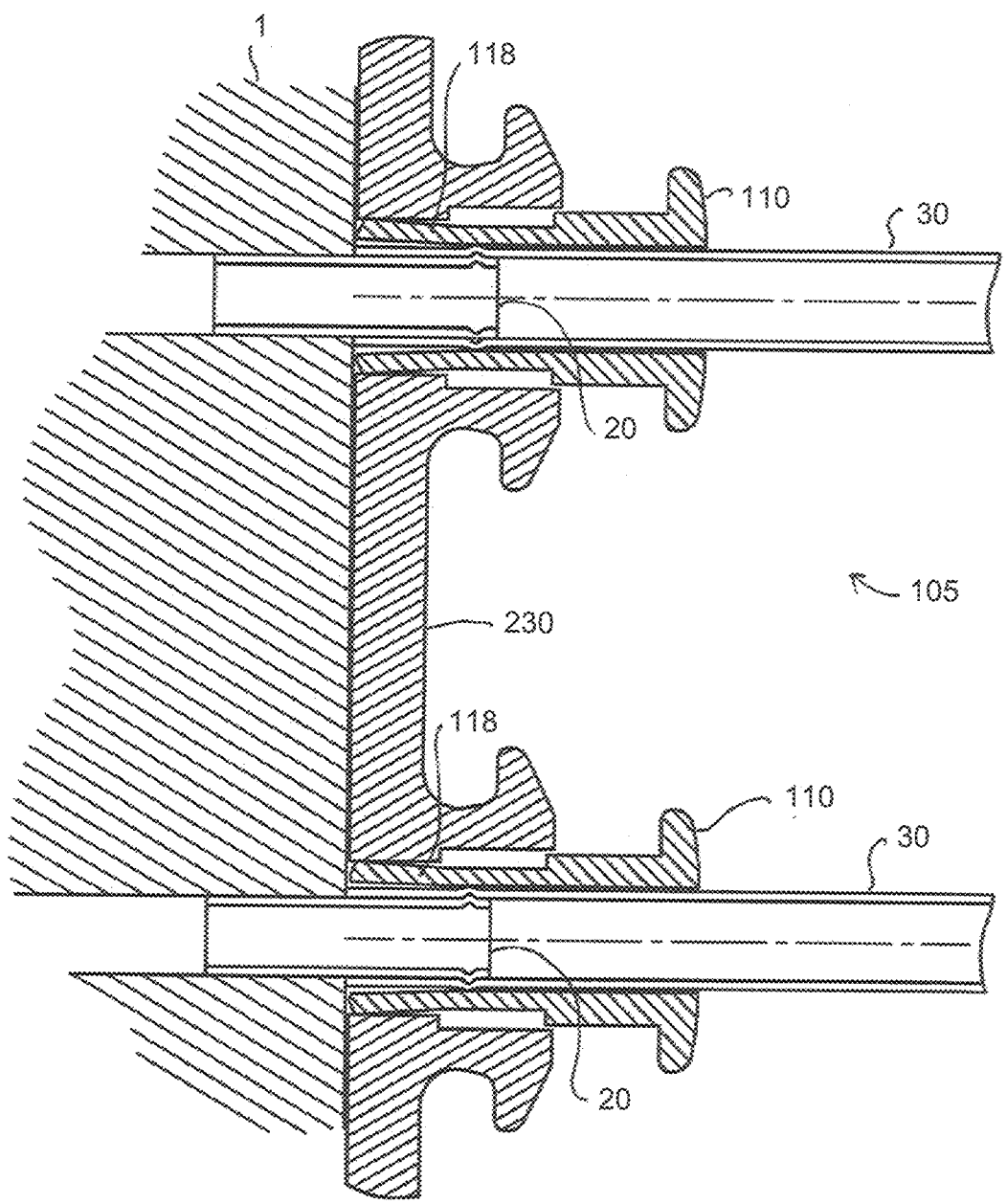

FIGS. 7a, 7b and 7c show a modification 105 of the coupling assembly in section. In this embodiment, the collar 130 of FIG. 1 has been replaced by a locking plate 230 which has plural through-apertures 232, each of which accepts a collet 110. The locking plate comprises projections 234 which serve in place of the flange 134 illustrated in the previous figures. The centres of the through-apertures are aligned with the centres of plural male parts projecting from a module 1, so that plural connections can be made in one operation.

In FIG. 7a the locking plate 230 can be seen offered up to the module 1 with collets 110 assembled in the through-apertures 232 and, inside the collets 110, tubings 30 already fitted over male parts, such as spigots 20. FIG. 7b shows the same coupling assembly as shown in FIG. 7a, but with the locking plate 230 and the collets 110 pushed in the direction of arrow R up to a front face of the module 1, such that the collets overlie the spigots 20 and the ends of the tubings 30. FIG. 7c shows another view of the coupling assembly of FIG. 7a, but now with the locking plate 230 pushed even further in the direction of arrow R in FIG. 7b. In FIG. 7c, the locking plate acts to clamp the fingers 118 of the collets 110 around the tubings 30, in a manner as described above.

Figure 7D:
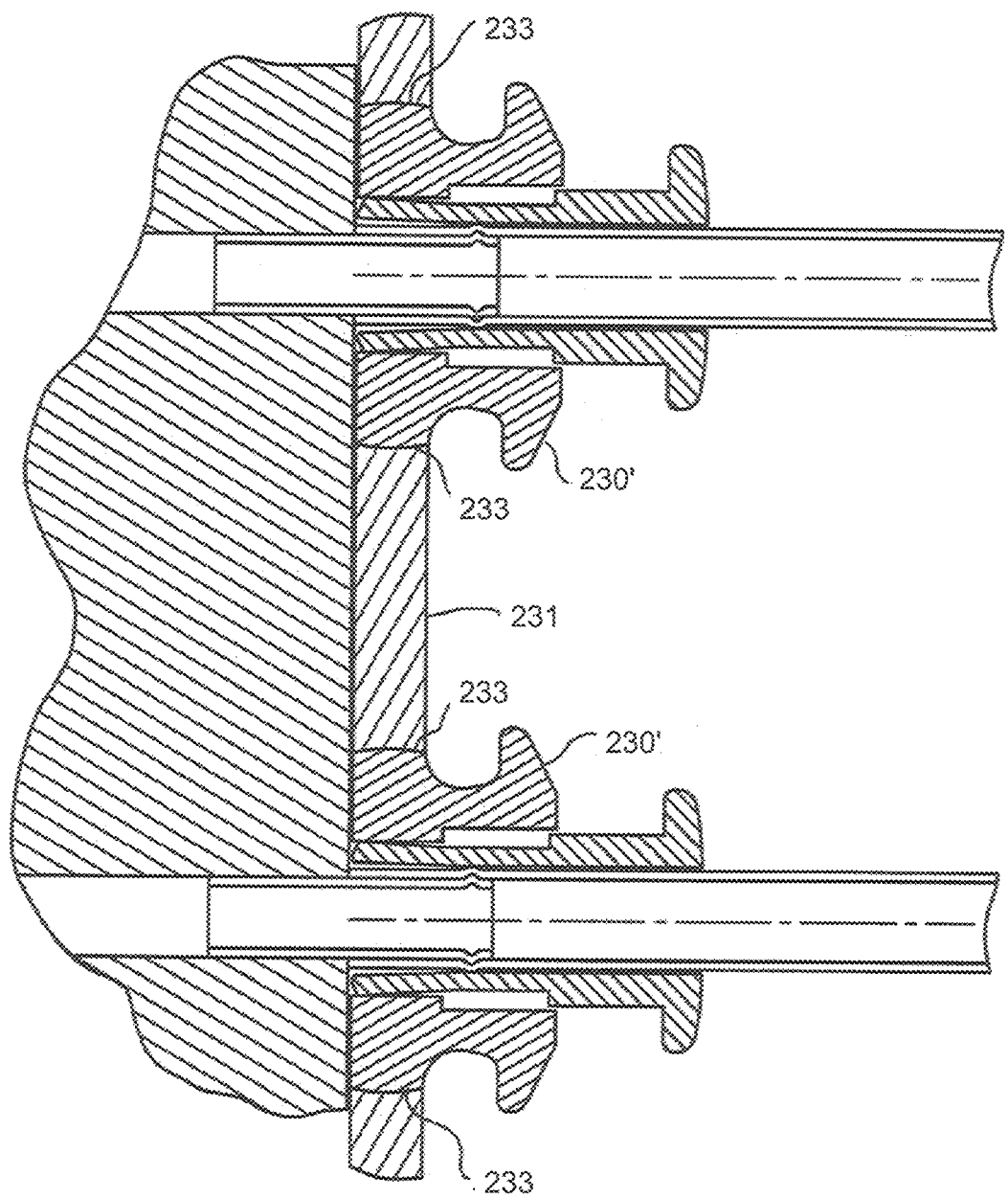

FIG. 7d shows yet another modification of the coupling assembly, where locking collars 230' are each mounted to a locking plate 231 by means of a flexible mount, in this case a spherically formed mount 233 which allows each collar 230' to rotate about a centre point of the mount 233 and thereby provides tolerance for a degree of misalignment or dimensional error in the male parts on the module. The locking plate could of course be formed from a flexible material to provide a similar tolerance. Two couplings are illustrated in FIG. 7a, but other linear arrays or two dimensional arrays of couplings could be employed, to match a configuration of male parts 20, for example an array of 4 couplings could be used to match the square male part arrangement shown in FIG. 8. The couplings need not be in the same plane. The couplings need not have generally parallel axes, if some degree flexibility is afforded, for example as described with reference to FIG. 7d. For ease of use tubing 30 may have a single coupling 100 at one end, and may come together at an opposite end in a multiple coupling 105, in the manner of a manifold.

FIG. 8 shows a chromatography system 11 comprising a support 80, which comprises conventional fluid processing modular components, in the form of interchangeable modules such as:

A pump 12;
A chromatography column 13;
Various valves 14;
A pH monitor 15;
A conductivity monitor 16;
A mixer 17; and
A UV monitor 18.

Other modules could be employed. The modules can be connected in any suitable manner using a fluid tubing 30 which has couplings 100 at each end, only one of which is shown for convenience. The couplings 100 could be replaced by multiple tubing and couplings 105 of the type shown in FIGS. 7a, b, c or d, to speed up connection and release of the couplings. For convenience, each of the valves 14 has the same male part configuration, meaning that the same configuration of locking plate 230 could be used for each valve.

FIG. 9 shows a release tool 200 which has a forked end 210 suitable for engagement with each side of a flange 134, or projection 234, to pull the same outwardly away from a module 1 or 12 to 18, or to push it, where there is no room for fingers to pull.

An alternative embodiment of the coupling 300 is shown in FIGS. 10, 11 and 12. In that embodiment a locking collar 330 (FIG. 10) surrounds a cylindrical inner component, in the form of a collet 310 having fingers 318 of the type described above, which fingers in turn surround the fluid tubing 30. To a large extent the coupling 300 is operable in the same manner as the couplings 100 and 105 described above, in that, to make a fluid-tight coupling, the tubing 30 is pushed over a male part 20 protruding from a module 1, then the collet is slid over the tubing until its distal end 340 is adjacent to, or abuts the module 1, and then the collar is moved toward the module to initiate the clamping of the fingers 318 of the collet 310. That position is shown in FIG. 11.

It will be noted that the distal end 340 comprises a pair of bayonet type openings for accepting complementary locking pins 27 which are supported by a boss 25 extending from the module 1 about the male part 20. In this embodiment, the final locking position of the collar 330 is not achieved until it is pushed further toward the module 1, into the finally locked position shown in FIG. 12, by means of manipulating, in a linear and rotational manner, a distal end 340 of the collar over, and along the boss 25 such that the bayonet openings 345 accept the pins 27. Thereby the fingers 318 are further clamped to the tubing 30 and the collar 330 (and coupling 300) is secured to the module 1, held in place by the pins 27.

The embedment shown in FIGS. 10, 11 and 12 relies on the substantially linear locking movement of a locking collar mentioned immediately above, i.e. where some twisting is employed to secure the collar 330 in place and to apply a clamping force. That twisting can be made easier by the use of wings 334 extending from the collar 330, instead of the flange mentioned above.

FIGS. 13 to 16 show portions of another collet 410 and collar 430 in detail, which could be employed with the couplings 100, 105, or 300. In this variant, the clamping of the fingers, fingers 418 in this case, can be brought about by twisting of the collar 430 about the collet 410, either as an alternative to the sliding motion of the collar 430, in the manner described above, or as well as said sliding motion.

In more detail an inner surface of the collar 430 has detents 432, which act tapering portions 431 of the fingers 418 as the collar is twisted relative to the fingers. The circumferential ramps 431 each act as a cam, being forced inwardly toward the tubing 30 by respective detents in use as the collar is twisted, in this example, in the direction of arrow R. Thereby the fingers 418 are compressed around the tubing 30 in use, from the position shown in FIGS. 13 and 14 to the clamping position shown in FIGS. 15 and 16 where at the detents come to rest in complementary recesses 433. The amount of twisting used for locking is 120 degrees or less, and preferably about 90 degrees or less if three or more circumferentially arranged fingers are employed.

Experiments have shown that the couplings 100, 105, and 300 described above, for use with a tubing having an outside diameter of around 3 to 10 mm are capable of sealing the tubing at the coupling, with internal fluid pressures of at least 10 Bar or higher like 15, 20, 25 or 30 Bar or more, as will be discussed more in detail embodiments of the couplings have been successfully verified by extensive leak testing at 30 Bar. Said couplings provide a fluid-tight connection of a tubing around a male part which is connectable and releasable by substantially linear only motion of the locking collar 130 or locking plate 230, without the need for twisting or threading of parts. Thus, the couplings can be spaced closer together than conventional threaded couplings because room for twisting is avoided. Herein substantially linear means 120 degrees or less of rotation, for example 90 degrees or less, less than 45 degrees, less than 30 degrees, less than 15 degrees, less than 5 degrees or almost no rotation.

Collar elements have been described in different embodiments each having the same functionality in the releasable coupling, namely the described features: locking collar 130, locking plate 230, locking collar 230', locking collar 330 and collar 430. One is non-cylindrical (locking plate 230) and the others are shaped cylindrically. The collar element comprises at least one projection, e.g. a collar flange 134 or wings 334, extending outwardly away from the aperture of a size allowing manual manipulation of the collar between the first and second positions.

The inner component has been described as a collet 110 in connection with FIGS. 1-7 which may be provided with a stop portion, such as a collet flange 114 and/or step 138. The collet flange 114 extends outwardly and is of a size which assists the manual manipulation of the coupling Furthermore, resiliently deflectable portion is a term that is equivalent to deflectable fingers 118 described in connection with FIGS. 1-7, and fingers 418 described in connection with FIGS. 13-16.

FIG. 17 shows a chromatography apparatus 400 according to an aspect of the invention. The apparatus comprises, but it not limited to, individual modular components 51 to 75 as listed below, at least some of which are demountable from an apertured front panel 420 of a support 410 of the apparatus 400 and mounted thereon in one generally vertical plane, such that the liquid connections required between modular components can be made only at the front face 420. In practice the demountable modular components have no more than two standard sizes which can, if needed, be repositioned on the panel 420 to suit a different procedure. Each modular component has a serial bus communication connection and power connection so that its physical position is immaterial to a controller for example located in the support 410, or located remotely. Thereby, the modular components can be regarded as modular and thereby repositionable and/or interchangeable.

The chromatography apparatus shown in FIG. 17 has the following modular component:

51 Control panel
52 pH monitor
53 Outlet valve 1-3, port 1 can be used for waste
54 Outlet valve 4-6
55 Conductivity monitor
56 Outlet valve 7-9
57 Pre-column Conductivity monitor
58 Column valve unit, comprising pre- and post-column pressure sensor
59 Bottles for pump rinsing solution
60 Inlet valve A1-A3
61 Inlet valve A4-A6
62 Inlet valve B1-B3
63 Inlet valve B4-B6
64 Fixed rubber feet
65 Adjustable feet
66 System pump A
67 System pump B
68 Flow restrictor, comprising system pressure monitor
69 Mixer modular component
70 Mixer valve
71 Air trap valve, comprising air sensor
72 Air trap
73 ON/OFF button 74 Holder for in-line filter (typical filter capsule shown)
75 UV monitor.

Modular components can be omitted or repositioned as explained above. It will be apparent that some modular components can be replaced with other modular components or the space left by an omitted modular component can be filled with a blanking plate (see e.g. 76 FIG. 20). More than one of the same numbered modular components can be used where necessary.

Fluid interconnections between the fluid manipulating modular components of the apparatus i.e. all the modular components listed above except modular components 51, 64, 65 and 73, and external modular components for example sample input reservoirs, buffer fluid reservoirs, chromatograph column(s) and fraction collection equipment, all not shown in FIG. 17, are made via fluid conduits in this case in the form of flexible plastics tubing, which can be readily coupled and uncoupled to corresponding ports of the fluid manipulating modular components, in any desired configuration, for example using a coupling as previously described.

FIG. 18 shows one possible liquid interconnection configuration between the main modular components of the chromatography apparatus 400, connected in this case to two chromatography columns 700 and 800, although the apparatus allows any workable interconnection between modular components and additional parts such as multiple columns, and liquid reservoirs. Reconfigurable liquid interconnections are denoted by short chain dotted lines 580.

At the heart of the apparatus 400 is the column valve unit 58, which in this case has a construction as disclosed in the pending application GB 1715399.0 filed 22 Sep. 2017 and is incorporated herein by reference. The value unit 58 provides multiple switching of flow for allowing flow in one or both columns 700/800 in either direction (up or down in the drawing). The user can select upflow or downflow, or select to bypass one or both columns. The flow can be directed to waste or to the next component in the flow path. The columns can also be connected in series, each column comprising a chamber of changeable volume for housing chromatographic separation media and an adapter moveable to increase or decrease each said volume, and wherein the column valve unit 58 is in fluid communication with each adapter and is selectively operable to move independently or collectively each adapter by means of fluid pressure changes to consequently change each volume and in use to cause compression or relief from compression of media within each column volume.

The column valve unit 58 comprises pre-column and post-column pressure sensors and further comprises a fluid inlet 510 configured to receive an input fluid. The input fluid may e.g. be a chemical sample suspended in a buffer composition. The column valve unit 58 further comprises a fluid outlet 520 configured to provide an output fluid from the valve unit. The provided output fluid may typically be the resulting fluid after passing the received input fluid through one or more columns of the chromatography apparatus 400. The valve unit 100 further comprises a first pair of fluid ports 531 and 532 configured to be coupled to a first column 700 and a second pair of fluid ports 541 and 542 configured to be coupled to a second column 800. The valve unit 58 further comprises a coupling valve assembly configured to direct fluid between a selection of the fluid inlet 510, the fluid outlet 520, the first pair of fluid ports 531 and 532 and the second pair of fluid ports 541 and 542 in response to one or more control signals.

In addition the valve has a port 550 which can be used to change the volume of hydraulic cylinders 710 and 810 which are part of the columns 700 and 800, for example to provide compression of the columns' contents, also known as column packing. That packing procedure can be automated. With such a system column diameters of between about 25 and 250 mm have been found to be packable in this way. The columns can be pre-packed, but rinsed and re-consolidated with the aid of pressure sensors in the value unit 58 measuring back-pressure resulting from pressure within the columns and in accordance with to known protocols, for example as described in WO2007045491, which disclosure is incorporated herein by reference.

The remaining system 400 comprises:

Inlet valve groups A and B, 60, 61, 62 and 63, suitable for providing selectable liquids comprising sample containing liquids buffer solutions, and cleansing fluids;

The inlet valves supply two system pumps, here each having a pair of pistons and associated one-way valves, providing a variable flow rate of between 0-600 ml per minute each (1200 ml/min max), with a high volume and resolution of flow, enabling accurate flow rates to be maintained. Such accuracy enables good repeatability of results for a wide range of column diameters;

The pumps supply, in series a flow restrictor 68, which comprises a system pressure monitor, a mixer valve 70, and a mixer module 69, before pumped liquid is diverted to the column valve unit 58;

Any entrained air can escape via an air trap valve 71, and an air trap vent 72, which vent also has an air escape from the columns 700 and 800. The air trap may be constructed in accordance with pending application GB1713993 filed 5 Apr. 2017, which disclosure is incorporated herein by reference;

Once liquids reach the column valve unit 58 they can be routed in accordance with the arrangement described in the pending application GB 1715399.0 filed 22 Sep. 2017, and thereby numerous modes of chromatography can be performed, from simple batch work, where a straightforward chromatographic separation process is performed using just one column, to procedures which more closely copy larger scale commercial procedures where two or more columns can be employed, one being readied for use while the other is being used for separation;

Output from the chromatography column(s) is passed out through port 520 to: a conductivity monitor 55, a UV light absorption monitor 75, and a pH monitor 52, and is thence directed into an appropriate storage vessel in dependence on the signals from the three monitors, and thereby, separated fractions are collected in an appropriate vessel 501. Column washings can be collected in a waste vessel 500;

The long chain dotted lines 610 in FIG. 2 represent a system bus which carries signals and power to and from the modular components mentioned above, to and from a controller 600. It will be appreciated that controlling and monitoring signals may be transmitted wirelessly according to known protocols, doing away with the need for a communication bus. The chromatography system 400 comprises also a display screen 530. Software running on the controller will display plural icons on the screen 530 and allow user manipulation of the icon on the screen to drag and drop the icons to form a series of icons representative of a user defined chromatography control method, for ease of use. The user defined chromatography control method comprises a continuous chromatography process employing said two or more chromatography columns by selective valve opening in said column valve unit 58.

FIGS. 19, 20 and 21 show the system connected with tubing for various configurations, where only some of the modular components referenced in FIG. 17 remain in place in these figures, and the apertures left by removed modular components are blanked off with blanking plates 526, screwed into place over the aperture to prevent accidental liquid ingress into the support 410.

In FIG. 19 a system 400' with a configuration of modular components suitable for regulated environments where systems are custom-built in a factory. The system is delivered mounted, calibrated, and performance tested and suitable for work in GMP environments. FIG. 20 shows one system 400" with some modular components removed, and FIG. 521 shows a system 400''' with more modular components in place, similar to FIG. 71, and showing typical tubular interconnections 580.

In use, modular components are easily removed or added to the system and installation finalized through a one-click activation in software which can recognize each modular component. The software can provide comprehensive and customizable operational control as well as pre-emptive maintenance. In addition to the modular components described above, input-output communication modular components can be used to interface with analogue and/or digital external sensors or other equipment such as automatic fraction collecting devices. The wide flow rate and pressure ranges enables more than 40-fold scaling in the range 25 to 250 mm internal diameter columns. This wide range makes the apparatus suitable to bridge the transition into GMP environments.

The packing (and re-packing) of chromatography columns, using the system described above is controllable fully by the controller 600 initiated by the control panel 51. The controller 600 is able to drive the display screen 530 (FIG. 18) to aid visualisation of the packing process and progress. The control software comprises an accessible column packing record. Columns packing records can therefore be defined, created, and updated from the software for traceability and quality assurance purposes. In addition, the record can be used to monitor column performance and provide statistics for usage, separation performance, and packing intervals.

The display screen can provide a process visualization which quickly gives an operator an overview of the system's function, progress through operational steps and alarms, only providing the desired amount of information at each step. The active flow path is always displayed in the process visualisation to minimize user errors. Real time changes can be made by selecting the appropriate process on the visualization screen, e.g. selecting or dragging icons on the screen. Control, graphical interfaces are provided for specific sections, such as the column valve unit 58.

Preprogramed steps are employed but these can be modified and saved as user-defined steps for added customization.

The system described and illustrated above is designed for sanitary environments. For example, the support 410 is flat or curved without joints, gaps or significant concavities, other than at the edges of the faces, which makes it easy to wipe down and reduces the chance of dust and liquid trapping. The pH monitor 52 has in-line calibration and the column valve unit 58 provides in-process column packing, so a closed flow path through operations can be employed, meaning that no breaks in the fluid path need be made throughout one or more chromatography column packing/regeneration stages and throughout the separation operation, FIG. 22 illustrates a prior art modular component 810 provided with four ports 811 each adapted to be connected to a prior art fluid connection 812. Due to the size of the coupling 813 required to secure the fluid connection 812 to the port 811, the couplings have to be arranged at different heights. This is a bulky solution and also requires that space is provided around the modular component to facilitate mounting/dismounting of fluid connections 812 to the respective port 811.

FIG. 23 illustrates a modular component 820 having four ports 821, each having a tubing 822, which at a first end thereof is provided with a releasable coupling 100 (as described in connection with FIGS. 1-6), connected to each respective port 821. A second end of one of the tubing is connected to a converter 823 with another releasable coupling 100, to provide attachment of a fluid connection not suitable to be connected directly to the port 821. The converter 823 is described in more detail in connection with FIGS. 24a and 24b. The result of using releasable couplings when connecting fluid connection to the modular component is a less bulky design since the ports may be positioned more closely to each other. Also the releasable coupling is easier to sanitize, to mount/dismount and replace if needed.

FIG. 24a shows a cross-sectional view of a converter 823, having a body 830, a flange 831, a through-hole 832 and a spigot 833 integrated with the body 830. The converter 823 is in this embodiment made from a single piece of material, such as plastic, metal, etc. The flange 831 is in this example adapted to be used in a Tri Clamp (TC) coupling, and the spigot 833 is adapted to receive a tubing provided with a resealable coupling 100 (not shown).

FIG. 24b shows a cross-sectional view of an alternative converter 823' similar to the converter described in connection with FIG. 24a with one exception. The converter 823' comprises two parts, wherein the body 830 and flange 831 are made from a single piece of material, e.g. plastic, and the spigot 833' is made from another material, e.g. metal.

FIG. 25a shows a prior art modular component 910 with three threaded holes as ports 911. Tubing 912, each provided with a treaded connector 913 is secured to the respective ports 911. FIG. 25b shows a threaded connector 913 comprising an end flange 914, secured to a first end of the tubing 912 and adapted to provide sealing when arranged in the threaded hole 911, and a body having a threaded portion 915 and a grip portion 916 designed to be used when securing the threaded connector 913 to the modular component 910. Due to the space needed to secure the threaded connectors 913 to the modular component 910, the design is rather bulky compared to when a releasable coupling is used, as shown i FIG. 23.

When a fluid tubing is connected to a port using a threaded connector, there is an unintentional turning of the fluid tubing (approximately 2-3 turns) when securing the threaded connector to a threaded hole. This is in particular a drawback when securing short fluid tubing, e.g. 10-30 cm long, where the tubing experience a kinking behaviour. Furthermore, a separate O-ring may be needed to create the desired pressure and fluid sealing.

In order to benefit from the advantages provided by the resealable coupling 100, adaptors may be introduced in the threaded holes of the modular component 910.

FIG. 26a shows a cross-sectional view of an adaptor 915, having a body 920, a threaded portion 921, a through-hole 922 and a spigot 923 integrated with the body 920. The adaptor 920 is in this embodiment made from a single piece of material, such as plastic, metal, etc. The threaded portion 921 is in this example adapted to be introduced in the threaded hole of a modular component using the body 920 as a grip portion, and the spigot 923 is adapted to receive a tubing provided with a resealable coupling 100 (not shown).

FIG. 26b shows a cross-sectional view of an alternative adaptor 915' similar to the adaptor described in connection with FIG. 26a with one exception. The converter 915' comprises two parts, wherein the body 920 and threaded portion 921 are made from a single piece of material, e.g. plastic, and the spigot 923' is made from another material, e.g. metal.

FIG. 27 shows a cross-sectional view of an alternative converter 925, having a body 930, a portion with a threaded hole 931, a through-hole 932 and a spigot 933 integrated with the body 830. The converter 925 is in this embodiment made from a single piece of material, such as plastic, metal, etc. The threaded hole 931 is in this example adapted to receive a threaded connector as described in connection with FIG. 25b. The spigot 933 is adapted to receive a tubing provided with a resealable coupling 100 (not shown). It should be noted that the spigot may be separately manufactured in a different material compared to the body and portion with the threaded hole.

An advantage of the releasable coupling assembly 10 is no thread which means sanitizable and less maintenance need. A simple widening 22 (i.e. sealing ridge, barb or bead) on a spigot 20 extending from the front of a panel is much easier to sanitize compared to a conventional screw on connector with very limited access into the threaded hole as illustrated in FIGS. 25a and 25b.

Another advantage is that no flange, in contrast to what is illustrated in connection with FIG. 22, is required, and it is therefore possible to cut the tubing manually before connecting it using the releasable coupling 100. Thus, it is easy to exchange tubing when needed due to the fact that the resting size of the inner diameter of the tubing is in the same range as the outer diameter of the sealing ridge 22 on the spigot 20, the resting size of the inner diameter of the tubing is preferably less than ±10% of the outer diameter of the spigot.

Another advantage is that no O-ring or gasket is required, which means less maintenance and more robust solution compared to prior art solutions. Sealing is achieved using the tubing material in direct sealing engagement with the sealing ridge 22. However, this requires the tubing to have some degree of flexibility and deformation properties. The resealable coupling provides minimum number of connections/ joints between different materials and parts which improves the possibility to sanitize the fluid connection if needed. Another advantage is that the resealable coupling assembly is easy to attach, e.g. one hand snap fitting for low pressure applications.

Converter connectors, as described in connection with FIGS. 24a, 24b and 27, may be used to provide connections to other connectors, e.g. TC connectors. Threaded adapters, as described in connection with FIGS. 26a and 26b, may be used to upgrade old equipment with threaded holes (see FIG. 25a) to connectors adapted to use the releasable coupling when attaching tubing.

As described above, spigots 20 may be arranged closer together than if screw type connectors or TC connectors were provided. This would enable shorter internal flow paths in the modular components, e.g. valves, whereby the use of releasable coupling assemblies may reduce the size of fluidic components with internal flow paths. This will in turn affect the whole chromatography system with reduced footprint in relation to the flow capacity.

FIGS. 28a and 28b show a cross-sectional view of a spigot without and with mounted tubing. It should be emphasized that the dimensions of the tubing (inner diameter D1) and the spigot (outer diameter D2) are important to create proper sealing and avoiding creating pockets between the tubing 30 and the open end 281 of the spigot 280, in which pockets deposition of residues from biological material may be caught. The elastic modulus of the tubing will provide the necessary deformation of the tubing to pass over the sealing ridge 282 provided in close proximity to the open end 821. The shape of the sealing ridge is important to achieve the desired functionality with key aspects:

sanitizability, since the direct sealing creates a pocket-less construction avoiding pockets where biological material may be trapped, upper pressure limit to hold the tubing to the spigot.

As mentioned above, other parameters of importance are:

Elastic modulus of the fluid tubing

Inner diameter of the fluid tubing and the outer diameter of the spigot

In some of the embodiments, the sealing ridge has a rounded design with radius R and a height h from centre of spigot. The radius extends to the open end of the spigot and provides an angle for allowing the tubing to slide over the sealing ridge onto the spigot using a force low enough for a normal operator and that the tubing does not bend under the pressure when sliding over the sealing ridge. the rounded section may start at a radius which is similar to the inner radius of the tubing. the height is determined by the elastic modulus of the tubing and pressure limits for the connector.

Other shapes of the sealing ridge are shown in FIGS. 28a, 29a and 29b. Arrows F1-F3 in FIG. 28b schematically indicates the forces involved in sealing and locking the tube end 30 on the spigot 280. In one embodiment, e.g. as exemplified by connector 100 above, the collet is arranged to apply the tubing clamping pressure at the spigot side of the midpoint of the sealing ridge as indicated by F2 in FIG. 28b. In one embodiment, essentially the fluid sealing force F1 between the tubing and the front end of the sealing ridge close to the open end of the spigot is achieved primarily by the elasticity of the tubing. The sealing is achieved without any pockets when positioning the sealing ridge in close proximity to the open end, i.e. no flat section at the open end of the spigot.

By applying the locking pressure essentially F2 behind the midpoint of the sealing ridge, essentially all available clamping force is used to keep the tubing on the sealing ridge. The pressure limit is dependent on the height of the sealing ridge, the clamping force, the slope of the sealing ridge and the friction coefficient between the tubing and the spigot. However, all surfaces should be as smooth as possible in order to be sanitizable. In alternative embodiments, parts of the available clamping force may be applied at the end section 281 of the spigot 280 in order to further secure the seal between the spigot and the tube. In the disclosed embodiment 100, the fingers 118 of the collet 110 are designed such that they only apply a clamping force in proximity to the sealing ridge 282 but leaves a space to the tube at the lower end of the spigot when in the clamping position. In this way the clamping force is less dependent of dimensional variations in the different components (spigot, tube, collet and collar) since the clamping force will involve spring loading of the fingers 118 about the clamping position. In the disclosed embodiment the available clamping force is determined by the force applied by the operator when pushing the collar 130 over the collet 110 into the tubing clamping position whereby the fingers 118 are displaced to abut the tube, the force needed for locking the clamp by pushing the collar 130 should be adapted to be a reasonable force for the user, while at the same time avoiding the need for a too high release force for releasing the clamp.

FIG. 28b shows a situation when the fluid tubing 30 is mounted over the sealing ridge 282 and the length of the spigot 280, and schematically indicates the locking pressure on the tubing applied to the spigot side of the midpoint of the sealing ridge. The fluid sealing force F1 between the tubing and the front end of the sealing ridge close to the open end of the spigot is achieved by the elasticity of the tubing. The sealing is achieved without any pockets when positioning the sealing ridge in close proximity to the open end, i.e. no flat section at the open end of the spigot.

By applying the locking pressure F2 behind the midpoint of the sealing ridge, essentially all available clamping force is used to keep the tubing on the sealing ridge. The pressure limit is dependent on the height of the sealing ridge, the clamping force, the slope of the sealing ridge and the friction coefficient between the tubing and the spigot. However, all surfaces should be as smooth as possible in order to be sanitizable. Furthermore, sharp corners may unintentionally create pockets where biological material may be trapped, and sharp corners therefore should be avoided in order to be sanitizable.

It may be desirable to provide an additional sealing force F3 at the base of the spigot (reverse side to the open end) to increase the sealing pressure limit. In one embodiment, at least 80% of the clamping force is applied behind the midpoint of the sealing ridge (indicated with F2). In one embodiment, abutment or a smaller pressure applied at or near the base of the spigot to stabilize the connection.

The clamping force may be provided using a releasable coupling as described above. Other types of couplings are possible, provided they provide suitable amount of clamping force as described above, e.g. hose clamps, eccentric couplings. The length of the selected connector has to be selected based on the length of the spigot to avoid leverage.

FIGS. 29a and 29b show cross-sectional views of alternative sealing ridge configurations. In FIG. 29a shows a spigot 290 having a first alternative sealing ridge 292 provided with a non-uniform contour. The rear edge 291 of the sealing ridge drops more rapidly from the midpoint of the sealing ridge to the outer surface of the spigot. This improves the pressure limit of the connection. Furthermore, the front end of the sealing ridge 292 is in line with the open end of the spigot as indicated by reference numeral D3. This will increase the force needed to mount the fluid tubing (not shown) compared to the spigot described in connection with FIGS. 28a and 28b.

FIG. 29b shows a spigot 295 having a second alternative sealing ridge 297 provided with a non-uniform contour. The rear edge 296 of the sealing ridge is curved with a radius r2 from the midpoint of the sealing ridge to the outer surface of the spigot. The contour from the midpoint of the sealing ridge to the open end of the spigot is curved with a radius r1, r1 is greater than r2.

Furthermore, the front end of the sealing ridge 297 is in line with the open end of the spigot as indicated by reference numeral D4, which in this example is greater than D3. which indicate that the force needed to mount the fluid tubing (not shown) compared to the spigot described in connection with FIG. 29a.

In general terms the present invention relates to a novel connector concept for chromatography systems, where the conventional threaded fluidic connectors as exemplified in FIGS. 25a and 25b may be replaced by a considerably more convenient connector of spigot type, where the tube for interconnecting components in the chromatography system simply is pushed onto a spigot and then secured thereon by a releasable clamp applying a radial clamping force on the outer periphery of the tube. As mentioned, the spigot is preferably provided with a sealing ridge in order to enable the connector concept to be used at the pressure ranges needed. It has surprisingly been verified that it is possible to design such a connector to provide a leak proof fluid connection at internal pressures exceeding the required ranges in liquid chromatography of 20 Bar and even up to above 30 Bar, while still significantly improving ease of use for the operator. The procedure for connecting a tube to a port in a chromatography system according to embodiments hereof simply involves the steps of pushing the tube end over the spigot, positioning the releasable connector clamp around the tube end and applying a locking force by actuating the connector clamp. Similarly, the procedure for disconnecting a tube from a port in a chromatography system according to embodiments hereof simply involves the steps of deactuating the connector clamp to release the locking force, optionally removing the releasable connector clamp from the tube end and pulling the tube end free from the spigot. One major benefit of the disclosed embodiments is that the steps of pushing and applying locking clamp does not require twisting motion that may transfer rotational motion to the tube whereby the tube is not rotated with respect to the male part during the step of applying. As mentioned this prevents the tube from getting twisted and from forming kinks that may restrict fluid flow or even destroy the tube segment. Further, compared to conventional chromatography systems with connectors that require flanged tubing, e.g. tubing with an inner diameter of 1 to 10 mm, the present system provides the benefit of allowing customization of the fluid path by adding the step of cutting the tube segment to an optimal length before interconnecting the path.

Leak Testing of Connector

Embodiments of the present connector/chromatography system have been verified to provide leak proof connections over the desired pressure range for liquid chromatography. In one embodiment, the chromatography system upper pressure limit for operation is at 20 Bar, and in order to verify proper sealing at 20 Bar the connectors have regularly been leak tested at 30 Bar. In the testing, the limit determining a leak was set to 1 µl/min at 20 Bar per connector in the tested flow path. Successful tests were performed under the following conditions:

Leak test at 20 Bar over a temperature range of 4-40° C.
6000 repeated connections and disconnections, leak test at 30 Bar at every 500 cycle (performed for two different dimensions)
Static leak test during 12 months at 40° C., leak test at 30 Bar once per week.
Tension pull testing 0-20 N 10000 cycles, leak test at 30 Bar before and after each cycle As previously mentioned it was surprisingly found that this was possible to achieve while providing such improved ease of use compared to conventional connections.

In addition to the above leak tests, Salt Creep Tests were performed by circulating a mobile phase of 2.5 M (NH4)

2SO4 in the system overnight (approximately 12 hours), with a backpressure of 1.5 MPa. Thereafter the system is visually inspected for salt creeping around the connectors, the valves and the other modules. It was verified that the connectors and the chromatography system passed the test without visible salt creep.

FIGS. 30a-30c Shows the interaction between the spigot 20, the tube 30 and the collet 110 and its fingers 118 in accordance with one embodiment. In FIG. 30a the tube end 310 is shown above the spigot wherein the dashed lines indicate the relationship between the inner diameter of the tube and the spigot elements. As can be seen, the spigot base is slightly wider than the tube inner diameter, and the sealing ridge 22 is significantly wider, but with a rounded front edge for allowing the tube to be pushed onto the spigot. In FIG. 30b, the tube end has been pushed onto the spigot (beyond the drawn part) and the collet 110 has been applied around the tube end and actuated in a locked position for clamping the tube. The collet 110 is disclosed in greater detail in FIG. 30c where it can be seen that the fingers 118 are provided with a clamping section 350 for clamping the tube at the region of the center of the sealing ridge 22 of the spigot 20. In one embodiment the tube inner diameter is 3.2 mm and the outer diameter 4.8 whereas the spigot base diameter is 3.25 and the sealing ridge 3.45 which together with the locking force from the clamp 10 provides a leak free connection. The tubes used in liquid chromatography systems of this type generally has tubes of sufficiently rigid material in order to comply with the pressures involved and may e.g. be made of Fluorinated EtenPropen (FEP) plastic.

According to one embodiment, a component 12-18; 810; 910 for a chromatography system 11 is disclosed. The component (which may be modular) comprises one or more ports, each port is accessible via a spigot 20; 923, 923' for receiving a first end of a fluid tubing 30; 812; 912. The first end being sealable around the spigot by a releasable coupling 100, 105, 300 external to the tubing end and the coupling having a releasable clamping action actuatable by sliding motion of a collar element 130, 230, 230', 330, 430 of the coupling along the end of the fluid tubing.

The spigot (20) may be an integral part of the component 12-18. Furthermore, the spigot 923; 923' may be provided on an adaptor 915; 915' configured to be connected to the port of the component 910. In some embodiments, the port is a threaded hole 911 and the adaptor 915, 915' comprises a corresponding threaded portion 921, body 920 and spigot 923; 923'.

In some embodiments, the adaptor 915 is made from a single piece of material, wherein the single piece of material may be plastic or metal.

In some embodiments, the spigot 923' is made from a first material, and the body 920 and the threaded portion 921 are made from a second material, wherein the first material may be a metal and the second material may be plastic.

According to one embodiment, a releasable coupling 100 configured to hold a fluid tubing to a spigot is disclosed. The coupling comprises:
a cylindrical inner component 110; 310; 410 configured to accept a fluid tubing 30, said inner component comprising a resiliently deflectable portion 118; 418 arranged to urge an outer surface of the tubing toward the spigot; and
a collar element 130 having and internal through-aperture 132 for slideably accepting the inner component, the aperture and resiliently deflectable portion having complementary surface formations which in a first position of the collar element mounted to the inner component provide for said resilient deflection in use, and which in a second different position prevent action against the outer surface of the fluid tubing.

The collar element comprises at least one projection extending outwardly away from the aperture of a size allowing manual manipulation of the collar between the first and second positions.

In some embodiments, the inner component 110 further comprises a stop portion 138; 114 co-operable with the collar element to prevent or inhibit the sliding of the collar element off the inner component in at least one direction.

In some embodiments, the collar element is slideable on the inner component from the first position where the deflection is provided, to the second position where the collar element abuts the stop portion.

In some embodiments, the collar flange 134 is formed at one end of the collar element, wherein the stop portion is formed at one end of the inner component. The collar flange 134 and stop portion can be brought into proximity by manual manipulation to the second position, and the collar element can be further slid by manual manipulation to the first position whereat the collar flange 134 is spaced from the stop portion.

In some embodiments, the portion is a collet flange 114 extending outwardly and of a size which assists the manual manipulation of the coupling. In some embodiments, the collar flange 134 is a continuous annular formation upstanding from the body 136 of the collar.

In some embodiments, the collar flange 134 and an outer surface of the collar element on which the collar flange is formed has a continuously curved profile with no sudden changes in direction.

In some embodiments, the resiliently deflectable portion 118; 418 of the inner component 110; 310; 410 comprises plural circumferentially arranged fingers which are deflectable inwardly toward the tubing in use. In some embodiments, the collar element 330 further comprises bayonet openings 345 cooperating with complementary locking pins 27 for releasably securing the coupling to a module 1.

According to one embodiment, a converter 823; 823'; 925 for connecting an end of a first fluid tubing 822 to an end of a second fluid tubing is disclosed. The converter comprises a spigot 833; 833'; 933 for receiving the end of the first fluid tubing 822, wherein the end of the first fluid tubing being sealable around the spigot by a releasable coupling 100, 105, 300 external to the tubing end. The coupling has a releasable clamping action actuatable by sliding motion of a collar element 130, 230, 230', 330, 430 of the coupling along the end of the fluid tubing.

In some embodiments, the converter 823; 823' further comprises a body 830 and a flange 831, or a body 930 and a portion with a threaded hole 931, configured to be connected to the end of the second fluid tubing.

In some embodiments, the converter 823 is made from a single piece of material, wherein the single piece of material may be plastic or metal.

In some embodiments, the spigot 833' is made from a first material, and the body 830 and the flange 831, or the body 930 and the portion with the threaded hole 931, are made from a second material. The first material may be a metal and the second material may be plastic.

According to one embodiment a chromatography system 11 comprising plural components 12-18; 810; 910 as described above, fluidically interconnectable by fluid tubing 30 is disclosed. The components comprises one or more spigots 20 for receiving a respective end of the fluid tubing 30, the fluid tubing end being sealable around the spigot by a releasable coupling 100, 105, 300 as described above, the coupling having a releasable clamping action actuatable by sliding motion of a collar element 130, 230, 230', 330, 430 of the coupling along the end of the fluid tubing.

In some embodiments, the sliding motion is motion generally toward a respective component, and the clamping action is releasable by the motion away from said component.

In some embodiments, the plural components 12-18 are modular components positionably rearrangeable on a support 80, and the fluid tubing 30 comprises multiple lengths of fluid tubing each having opposed ends provided with one said coupling 100, 105, 300 at each end, in use together allowing for generally sealed fluid flow or fluid communication between respective modular components.

In some embodiments, the sliding motion is linear motion only, or is substantially linear motion with a twisting motion of 120 degrees or less.

In some embodiments, the chromatography system is a chromatography system formed from the plural components.

In some embodiments, the chromatography system further comprises a converter as described above.

According to one embodiment there is provided a chromatography system comprising plural fluid handling components fluidically interconnectable by fluid tubing 30 to form a chromatography fluid flow path, said fluid handling components comprising one or more fluid ports with a spigot extending from a component face and for receiving a respective end of the fluid tubing such that the fluid tubing end sealingly embraces the spigot and for receiving a releasable locking clamp for applying a radial locking force on an outer surface of the tubing end for locking the fluid tube end on the spigot, wherein the interconnection is leak proof at an internal of pressure at least 10 Bar preferably 15, 20, 25 or 30 Bar.

The invention is not to be seen as limited by the embodiments described above, but can be varied within the scope of the appended claims as is readily apparent to the person skilled in the art.

The invention claimed is:

1. A chromatography system comprising plural fluid handling components fluidically interconnectable by fluid tubing to form a bioprocess fluid flow path, said fluid handling components comprising one or more fluid ports with a spigot extending from a component face and configured to receive a respective end of the fluid tubing such that the fluid tubing end sealingly embraces the spigot and for receiving a releasable locking clamp thereon for applying a radial locking force on an outer surface of the tubing end for locking the end of the fluid tubing on the spigot, characterised in that an interconnection between the plural fluid handling components withstands at least 10 bar, and wherein the releasable locking clamp comprises:
    a cylindrical inner component for accepting the fluid tubing, said inner component including a resiliently deflectable portion arranged to urge the outer surface of the fluid tubing toward a respective spigot; and
    a locking component having an internal through-aperture for accepting the inner component, the through-aperture and resiliently deflectable portion having complementary surface formations which in a first position of the locking component mounted to the inner component provide for resilient deflection in use, and which in a second different position do not cause said deflection,
    wherein the spigot comprises an open end,
    wherein a clamping force is applied on the resiliently deflectable portion of the inner component in the first position of the locking component,
    wherein the clamping force is generated by a movement of the locking component along the inner component towards the opposite direction as the open end of the spigot, and
    wherein the inner component extends beyond the locking component in the same direction as the open end of the spigot in both the first and second positions.

2. The chromatography system of claim 1, wherein the interconnection withstands at least 15, 20, 25 or 30 bar.

3. The chromatography system of claim 1, wherein the spigot is provided with an open end having a widening in proximity to the open end, wherein the end of the fluid tubing is arranged to be in sealing engagement with the widening around the outer surface of the spigot.

4. The chromatography system of claim 1, wherein the resiliently deflectable portion of the inner component comprises plural circumferentially arranged fingers which are deflectable inwardly in use.

5. The chromatography system according to claim 1, wherein the clamping force is generated by a substantially linear motion of the locking component along the inner component.

6. The chromatography system according to claim 5, wherein the substantially linear motion is a sliding motion of the locking component along the inner component.

7. The chromatography system according to claim 3, wherein a clamping force is applied on the resiliently deflectable portion of the inner component in the first position of the locking element, wherein the clamping force is generated by a motion of the locking component along the inner component, and wherein the motion is a twisting motion of the locking component about the inner component.

8. The chromatography system of claim 1, wherein the fluid tubing has an outside diameter of around 3 to 10 mm.

9. The chromatography system of claim 1, wherein the fluid tubing has a resting size of an inner diameter that is less than ±10% of an outer diameter of the spigot.

10. The chromatography system of claim 3, wherein the widening of the spigot comprises a sealing ridge.

11. The chromatography system of claim 10, wherein the fluid tubing has an inner diameter of 3.2 mm and an outer diameter of 4.8 mm, and the spigot has a base diameter of 3.25 mm and the sealing ridge a diameter of 3.45 mm.

12. The chromatography system of claim 1, wherein the fluid tubing is formed of a substantially rigid material.

13. The chromatography system of claim 12, wherein the substantially rigid material comprises Fluorinated EtenPropen (FEP) plastic.

14. The chromatography system according to claim 1, wherein the fluid handling components are at least one of the following: an outlet valve, an inlet valves, an air trap valve, a column valve, a mixer valve and a pump.

15. The chromatography system according to claim 1, wherein the fluid ports are arranged as non-threaded holes having the spigot protruding from the front face of the at least one fluid handling component.

16. The chromatography system according to claim 1, wherein the chromatography system comprises the releasable locking clamp.

17. A chromatography column comprising at least one spigot for connecting said chromatography column to a chromatography system through a releasable locking clamp, wherein the at least one spigot of the chromatography column is arranged to protrude from a surface of the chromatography column and for receiving a respective end of the fluid tubing such that the fluid tubing end sealingly embraces the spigot and for receiving the releasable locking clamp for applying a radial locking force on an outer surface of the tubing end for locking the end of the fluid tubing on the spigot, wherein the releasable locking clamp comprises:
 a cylindrical inner component for accepting a fluid tubing, said inner component including a resiliently deflectable portion arranged to urge an outer surface of the fluid tubing toward a respective spigot; and
 a locking component having an internal through-aperture for accepting the inner component, the through-aperture and resiliently deflectable portion having complementary surface formations which in a first position of the locking element mounted to the inner component provide for resilient deflection in use, and which in a second different position do not cause said deflection,
 wherein the spigot comprises an open end,
 wherein a clamping force is applied on the resiliently deflectable portion of the inner component in the first position of the locking element,
 wherein the clamping force is generated by a movement of the locking component along the inner component towards the opposite direction as the open end of the spigot, and
 wherein the inner component extends beyond the locking component in the same direction as the open end of the spigot in both the first and second positions.

\* \* \* \* \*